United States Patent
Yao et al.

(10) Patent No.: US 12,112,256 B2
(45) Date of Patent: Oct. 8, 2024

(54) LOSS-ERROR-AWARE QUANTIZATION OF A LOW-BIT NEURAL NETWORK

(71) Applicants: Intel Corporation, Santa Clara, CA (US); Anbang Yao, Beijing (CN); Aojun Zhou, Beijing (CN); Kuan Wang, Beijing (CN); Hao Zhao, Beijing (CN); Yurong Chen, Beijing (CN)

(72) Inventors: Anbang Yao, Beijing (CN); Aojun Zhou, Beijing (CN); Kuan Wang, Beijing (CN); Hao Zhao, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 965 days.

(21) Appl. No.: 16/982,441

(22) PCT Filed: Jul. 26, 2018

(86) PCT No.: PCT/CN2018/097193
§ 371 (c)(1),
(2) Date: Sep. 18, 2020

(87) PCT Pub. No.: WO2020/019236
PCT Pub. Date: Jan. 30, 2020

(65) Prior Publication Data
US 2021/0019630 A1 Jan. 21, 2021

(51) Int. Cl.
*G06N 3/063* (2023.01)
*G06F 18/21* (2023.01)
(Continued)

(52) U.S. Cl.
CPC ......... *G06N 3/063* (2013.01); *G06F 18/2148* (2023.01); *G06F 18/217* (2023.01); *G06N 3/047* (2023.01); *G06N 3/084* (2013.01)

(58) Field of Classification Search
None
See application file for complete search history.

(56) References Cited

U.S. PATENT DOCUMENTS

2017/0270408 A1 * 9/2017 Shi .................. G06N 3/04

FOREIGN PATENT DOCUMENTS

| CN | 106796668 | 5/2017 |
| CN | 108229681 | 6/2018 |
| WO | 2018076331 | 5/2018 |

OTHER PUBLICATIONS

Zhou, Shu-Chang, et al. "Balanced quantization: An effective and efficient approach to quantized neural networks." Journal of Computer Science and Technology 32 (2017): 667-682. (Year: 2017).*

(Continued)

*Primary Examiner* — Daniel T Pellett
(74) *Attorney, Agent, or Firm* — Hanley, Flight & Zimmerman, LLC

(57) ABSTRACT

Methods, apparatus, systems and articles of manufacture for loss-error-aware quantization of a low-bit neural network are disclosed. An example apparatus includes a network weight partitioner to partition unquantized network weights of a first network model into a first group to be quantized and a second group to be retrained. The example apparatus includes a loss calculator to process network weights to calculate a first loss. The example apparatus includes a weight quantizer to quantize the first group of network weights to generate low-bit second network weights. In the example apparatus, the loss calculator is to determine a difference between the first loss and a second loss. The example apparatus includes a weight updater to update the second group of network weights based on the difference.

(Continued)

The example apparatus includes a network model deployer to deploy a low-bit network model including the low-bit second network weights.

21 Claims, 11 Drawing Sheets

(51) Int. Cl.
*G06F 18/214* (2023.01)
*G06N 3/047* (2023.01)
*G06N 3/084* (2023.01)

(56) References Cited

OTHER PUBLICATIONS

Zhou, Aojun, et al. "Incremental network quantization: Towards lossless cnns with low-precision weights." arXiv preprint arXiv: 1702.03044 (2017). (Year: 2017).*

Dong, Yinpeng, et al. "Learning accurate low-bit deep neural networks with stochastic quantization." arXiv preprint arXiv: 1708.01001 (2017). (Year: 2017).*

Wang, Peisong, et al. "Two-step quantization for low-bit neural networks." Proceedings of the IEEE Conference on computer vision and pattern recognition. 2018. (Year: 2018).*

International Searching Authority, "Search Report and Written Opinion," issued in connection with PCT patent application No. PCT/CN2018/097193, mailed on May 5, 2019, 8 pages.

A. Krizhevsky, I. Sutskever, and G. E. Hinton. Imagenet classification with deep convolutional neural networks. InNIPS, 2012, 9 pages.

He et al. "Deep residual learning for image recognition," In CVPR, 2016, 12 pages.

Huang et al., "Densely connected convolutional networks," In CVPR, 2017, 9 pages.

Courbariaux et al., "Binarized neural networks: Training neural networks with weights and activations constrained to +1 or −1," In NIPS, 2016, 11 pages.

Li et al. "Ternary weight networks.," a, 2016, 5 pages.

Zhou et al., "Dorefa-net: Training low bitwidth convolutional neural networks with low bitwidth gradients," 2016, 13 pages.

Zhu et al., "Trained ternary quantization.,"n ICLR, 2017, 10 pages.

Rastegari et al., "Xnornet: Imagenet classification using binary convolutional neural networks," In ECCV, 2016, 17 pages.

Hou et al., "Loss-aware binarization of deep networks," In ICLR, 2017, 11 pages.

L. Hou and J. T. Kwok. Loss-aware weight quantization of deep networks. ICLR, 2018, 16 Pages.

Zhou et al., "Incremental network quantization: Towards lossless cnns with low-precision weights, "In ICLR, 2017, 14 pages.

* cited by examiner

LOSS-ERROR-AWARE QUANTIZATION OF A LOW-BIT NEURAL NETWORK

This patent arises as a national stage of PCT patent application No. PCT/CN2018/097193, which was filed on Jul. 26, 2018, and which is hereby incorporated by reference in its entirety for all purposes.

FIELD OF THE DISCLOSURE

This disclosure relates generally to deep neural networks, and, more particularly, to systems and methods for loss-error-aware quantization of a low-bit neural network.

BACKGROUND

Deep Neural Networks (DNNs) have demonstrated record breaking results in a variety of artificial intelligence fields such as computer vision, speech recognition, and natural language processing. As DNNs become more popular, the architecture of mainstream DNNs has evolved to be significantly deeper and more complex than an early 8-layer network called AlexNet. Despite advances in network design and accuracy improvement, the intensive storage and computational costs of top performing DNN models make it difficult to deploy such models on mobile, embedded, and/or Internet-of-Things (IoT) devices for real-time applications.

DETAILED DESCRIPTION

Figure 1:
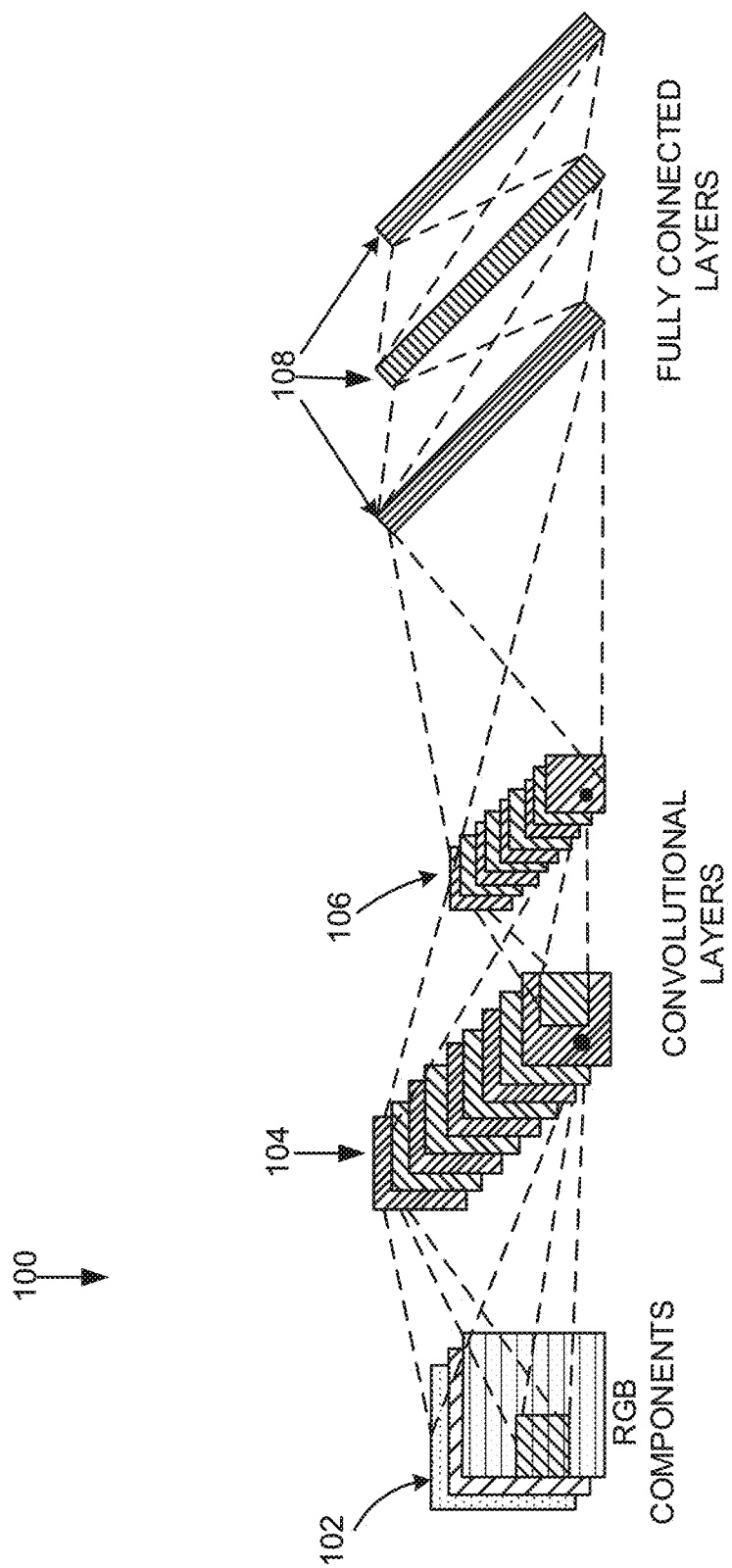
FIG. 1 illustrates an example convolutional neural network.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Overview

Certain examples provide systems and associated methods for explicit loss-error-aware quantization (ELQ). Certain examples provide deep neural networks (DNNs) with ELQ to improve accuracy, training efficiency, and ease of implementation in DNN quantization. Such ELQ differs from prior solutions in at least optimization formulation and quantization strategy, for example.

Traditionally, despite substantial research, DNN solutions are difficult to implement on low-power devices. For example, while there is a growing interest in deploying DNNs on low-power embedded systems (e.g., cellular phones, other battery-powered devices, etc.) such systems have limited memory storage and computing power. In contrast, DNNs typically require hundreds of megabytes of memory storage for trainable full-precision floating-point parameters or weights and utilize billions of floating-point operations (FLOPs) to make a single inference. For at least these reasons, compression and acceleration are difficult to achieve with a DNN on a low power device.

In response to these problems and other concerns, ultra-low-bit DNN quantization can be applied to DNN models. Quantization techniques store and calculate numbers in more compact formats. Certain examples train DNN models whose weights are forced to be very low-bit values, such as ternary and binary values, without noticeable loss of model accuracy when compared with full-precision (e.g., 32-bit floating-point) number counterparts. By representing DNN models with very low-bit parameter values, such as $\{-1, 0, 1\}$ and $\{-1, 1\}$, multiplied with layer-wise scaling factors, specialized deep learning hardware and other DNN applications can benefit from replacing time-intensive multiplication operations with simple bit-shift and accumulation operations, for example.

Certain methods such as binary weight networks (BWNs), tertiary weight networks (TWNs), DoReFa-Net, XNOR-Net, and trained ternary quantization (TTQ) can achieve a ternary or binary quantization goal by a straightforward approximation of layer-wise weights or inner product outputs of a full-precision network model. In the approximation, such methods try to minimize an error of layer-wise weights or inner products of the weights as well as inputs between original models and corresponding quantized models. However, replacing 32-bit, full-precision floating-point weight values with very low-bit equivalents introduces fluctuations to weight and output magnitudes. As a result, regularizing approximation error is important. Additionally, approximation error introduces perturbation into classification loss, which influences predication accuracy of a quantized DNN model. Therefore, a careful handling of such a loss perturbation is also important to suppress common model accuracy loss.

One example quantization method is a proximal Newton algorithm based quantization method that directly minimizes loss with respect to quantized weights. However, the proximal Newton algorithm needs to estimate a second order Hessian matrix of the loss function with respect to the quantized weights and input activations, which adds computational complexity that is unacceptable in a low-power device. This computational complexity prohibits use of the proximal Newton algorithm in training with a large-scale dataset such as ImageNet, etc.

Unlike existing methods that pose the training quantization problem as a straightforward approximation problem (e.g., minimizing error of layer-wise weights or inner products of the weights and inputs between original and respective quantized models, etc.) in the quantization, certain examples described herein provide ELQ to jointly and explicitly regularize weight approximation error and accompanying loss perturbation. To train lossless quantized models, the ELQ bridges loss perturbation from weight quantization with an incremental quantization strategy to address DNN quantization. By explicitly regularizing loss perturbation and weight approximation error incrementally, ELQ provides improved training of DNN models with very low-bit parameter values to form approximate substitutes for 32-bit, full-precision floating-point counterpart models without a noticeable loss of predication accuracy. Execution on an ImageNet large scale 1-$k$ classification task using two mainstream convolutional neural network families (e.g., fully convolutional and non-fully convolutional) shows the leading performance of the ELQ described herein.

Machine Learning Overview

A machine learning algorithm is an algorithm that can learn based on a set of data. Examples of machine learning algorithms can be designed to model high-level abstractions within a data set. For example, image recognition algorithms can be used to determine which of several categories to which a given input belong; regression algorithms can output a numerical value given an input; and pattern recognition algorithms can be used to generate translated text or perform text to speech and/or speech recognition.

An example machine learning algorithm is a neural network. There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (e.g., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, an output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

An accuracy of a machine learning algorithm can be affected significantly by the quality of the data set used to train the algorithm. In certain examples, a machine learning application can be configured to train a neural network using a training dataset or to use a trained deep neural network to implement machine intelligence. The machine learning application can include training and inference functionality for a neural network and/or specialized software that can be used to train a neural network before deployment. The machine learning application can implement any type of machine intelligence including but not limited to image recognition, mapping and localization, autonomous navigation, speech synthesis, medical imaging, or language translation.

Hardware acceleration for the machine learning application can be enabled via a machine learning framework. The machine learning framework can provide a library of machine learning primitives. Machine learning primitives are basic operations that are commonly performed by machine learning algorithms. Without the machine learning framework, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework. Example primitives include tensor convolutions, activation functions, and pooling, which are computational operations that are performed while training a convolutional neural network (CNN). The machine learning framework can also provide primitives to implement basic linear algebra subprograms performed by many machine-learning algorithms, such as matrix and vector operations. The machine learning framework can process input data received from the machine learning application and generate the appropriate input to a compute framework.

Machine Learning Neural Network Implementations

The computing architecture provided by examples described herein can be configured to perform the types of parallel processing that is particularly suited for training and deploying neural networks for machine learning. A neural network can be generalized as a network of functions having a graph relationship. A variety of neural network implementations can be used in machine learning. One example type of neural network is the feedforward network, as previously described above.

A second example type of neural network is a Convolutional Neural Network (CNN). A CNN is a specialized feedforward neural network for processing data having a known, grid-like topology, such as image data. Accordingly, CNNs are commonly used for compute vision and image recognition applications, but CNNs also may be used for other types of pattern recognition such as speech and language processing. Nodes in the CNN input layer are organized into a set of "filters" (e.g., feature detectors inspired by receptive fields found in the retina), and an output of each set of filters is propagated to nodes in successive layers of the network. Computations for a CNN include applying a convolution mathematical operation to each filter to produce the output of that filter. Convolution is a specialized kind of mathematical operation performed by two functions to produce a third function that is a modified version of one of the two original functions. In convolutional network terminology, a first function to the convolution can be referred to as the input, and a second function can be referred to as the convolution kernel. The output may be referred to as a feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. An architecture for an RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The example neural networks described above can be used to perform deep learning. Deep neural networks used in deep learning are artificial neural networks including multiple hidden layers, rather than shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network can be specialized for the specific task to be performed, and different models are used to perform different tasks.

Once the neural network is structured, a learning model can be applied to the network to train the network to perform specific tasks. The learning model describes how to adjust the weights within the model to reduce the output error of the network. Backpropagation of errors is a common method used to train neural networks. In backpropagation, an input vector is presented to the network for processing. An output of the network is compared to a desired output using a loss function, and an error value is calculated for each of the neurons in the output layer. The error values are then propagated backwards until each neuron has an associated error value which roughly represents its contribution to the original output. The network can then learn from those errors using an algorithm, such as a stochastic gradient descent algorithm, to update weights of the neural network.

FIG. 1 illustrates an example convolutional neural network 100. As shown in the example of FIG. 1, a CNN 100 used to model image processing can receive input 102 describing the red, green, and blue (RGB) components of an input image. The input 102 can be processed by multiple convolutional layers (e.g., a first convolutional layer 104, a second convolutional layer 106, etc.). An output from the multiple convolutional layers 104, 106 can be processed by a set of fully connected layers 108. Neurons in a fully connected layer 108 have full connections to all activations in the previous layer. An output from the fully connected layers 108 can be used to generate an output result from the network. Activations within the fully connected layers 108 can be computed using matrix multiplication instead of convolution, for example. Not all CNN implementations use fully connected layers 108. For example, in some implementations, the second convolutional layer 106 can generate an output for the CNN 100.

In certain examples, the convolutional layers 104, 106 are sparsely connected, which differs from traditional neural network configuration found in the fully connected layers 108. Traditional neural network layers are fully connected, such that every output unit interacts with every input unit. However, the convolutional layers 104, 106 are sparsely connected because the output of the convolution of a field is input (instead of the respective state value of each of the nodes in the field) to the nodes of the subsequent layer, as illustrated in the example of FIG. 1. Kernels associated with the convolutional layers 104, 106 perform convolution operations, the output of which is sent to the next layer. The dimensionality reduction performed within the convolutional layers 104, 160 is one aspect that enables the CNN 100 to scale to process large images.

Figure 2:
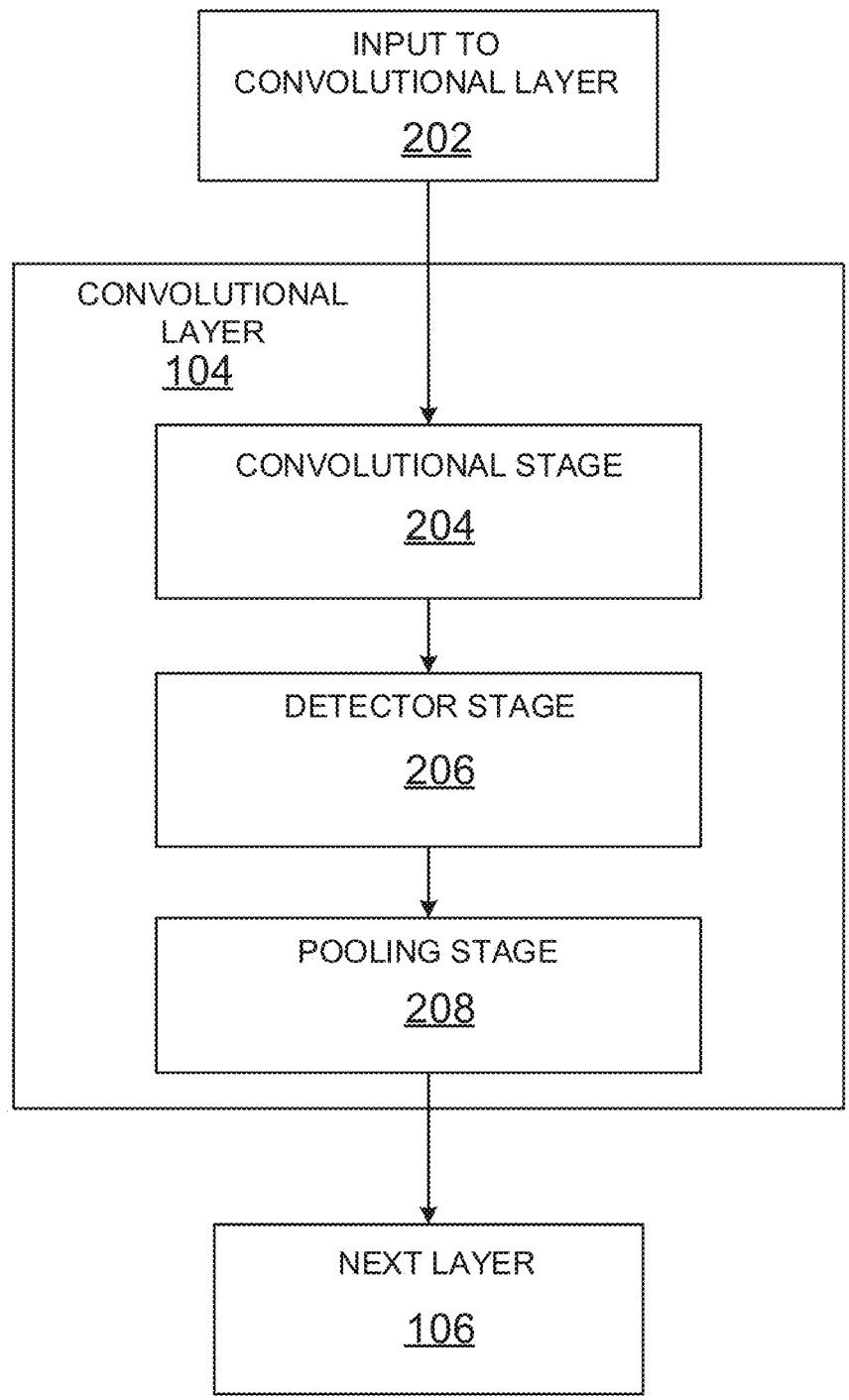
FIG. 2 illustrates example computation stages within a convolutional layer of the convolutional neural network of FIG. 1.

FIG. 2 illustrates example computation stages within a convolutional layer 104, 106 of the CNN 100. Convolutional layer 104 is used for purposes of illustration only in the example of FIG. 2. Input 202 to the convolutional layer 104 of the CNN 100 can be processed in three stages of the convolutional layer 104. The three stages can include a convolution stage 204, a detector stage 206, and a pooling stage 208. The convolution layer 104 can then output data to a successive convolutional layer 106, for example. The final convolutional layer 106 of the network 100 can generate output feature map data or provide input to a fully connected layer 108, for example, to generate a classification value for the input to the CNN 100.

In certain examples, the convolution stage 204 performs several convolutions in parallel to produce a set of linear activations. The convolution stage 204 can include an affine transformation, which is any transformation that can be specified as a linear transformation plus a translation. Affine transformations include rotations, translations, scaling, and combinations of these transformations, for example. The convolution stage 204 computes the output of functions (e.g., neurons) that are connected to specific regions in the input, which can be determined as the local region associated with the neuron. The neurons compute a dot product between the weights of the neurons and the region in the local input to which the neurons are connected, for example. Output from the convolution stage 204 defines a set of linear activations that are processed by successive stages of the convolutional layer 104.

The linear activations can be processed by a detector stage 206. In the detector stage 206, each linear activation is processed by a non-linear activation function. The non-linear activation function increases the nonlinear properties of the overall network without affecting the receptive fields of the convolution layer. For example, one non-linear activation function is a rectified linear unit (ReLU), which uses an activation function defined as ƒ(x)=max (0,x), such that the activation has a threshold at zero.

In certain examples, batch normalization (BN) can also be applied to extend normalization of the input layer of the CNN 100 to one or more hidden layers of the CNN 100. For example, BN normalizes an output of a previous activation layer by subtracting a batch mean value and dividing by a batch standard deviation. However, BN may adjust weights in a subsequent layer based on the change in output, so BN can add two trainable parameters to each layer: a mean parameter, (3, and a standard deviation parameter, γ. Rather than changing all network weights, the beta and gamma weights can be changed for each activation to maintain network stability, for example.

The pooling stage 208 uses a pooling function that replaces the output of the second convolutional layer 106 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 208, including max pooling, average pooling, and l2-norm pooling. Additionally, some CNN implementations do not include a pooling stage. Instead, such implementations substitute and additional convolution stage having an increased stride relative to previous convolution stages.

Thus, in certain examples, after a convolutional operation, batch normalization, activation (e.g., ReLU) and pooling can be applied to down-sampled layers of the CNN 100.

The output from the convolutional layer 104 can then be processed by the next convolutional layer 106. The next convolutional layer 106 can be an additional convolutional layer or one of the fully connected layers 108. For example, the first convolutional layer 104 of FIG. 1 can output to the second convolutional layer 106, while the second convolutional layer 106 can output to a first layer of the fully connected layers 108.

Figure 3:
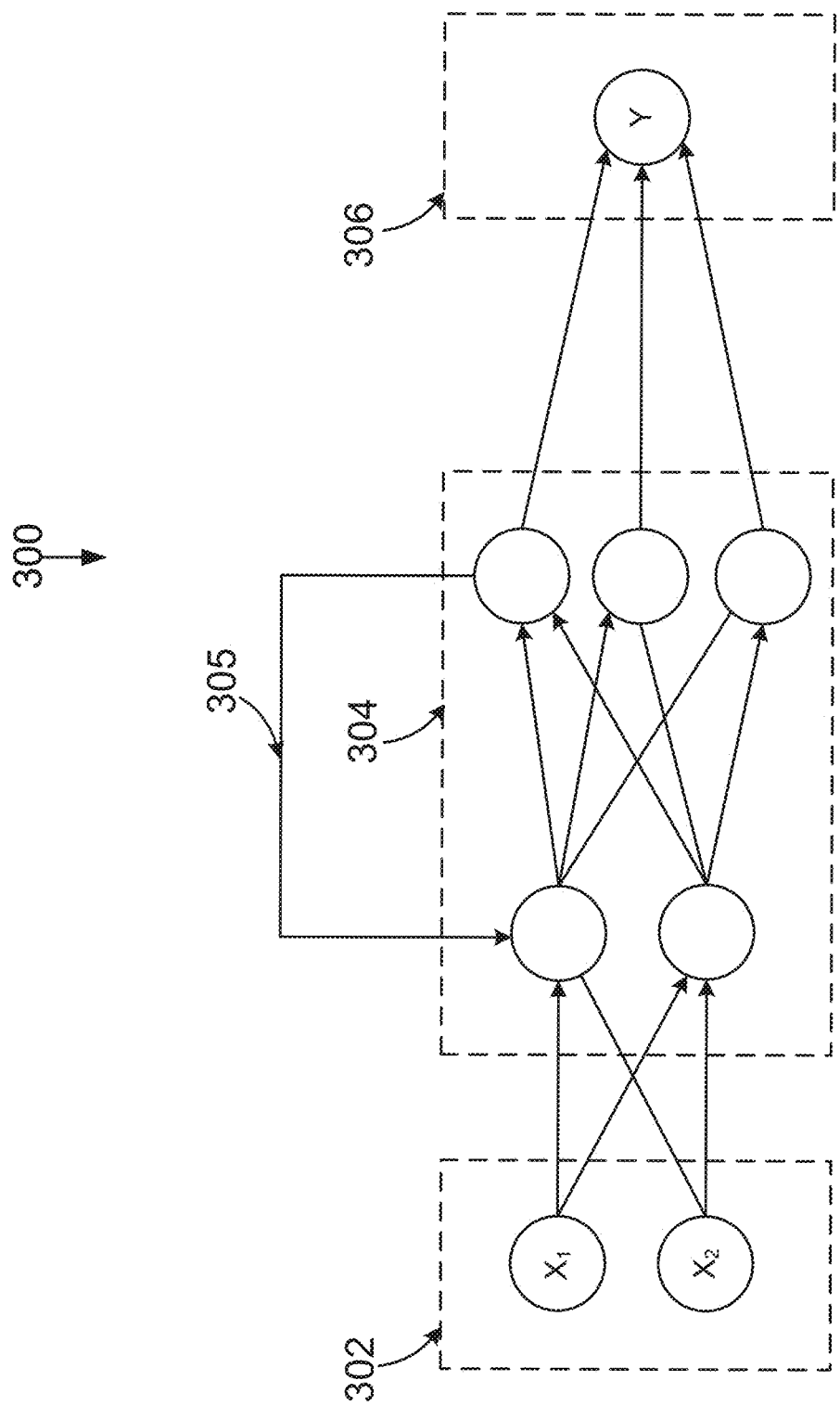
FIG. 3 illustrates an example recurrent neural network.

FIG. 3 illustrates an example recurrent neural network 300. In the recurrent neural network (RNN) 300, a previous state of the network 300 influences an output of a current state of the network 300. The RNN can be used with mathematical models to predict the future based on a prior sequence of inputs, for example. For example, the RNN 300 can be used to perform statistical language modeling to predict an upcoming word given a previous sequence of words. The illustrated RNN 300 includes an input layer 302 that receives an input vector, hidden layers 304 to implement a recurrent function, a feedback mechanism 305 to enable a 'memory' of previous states, and an output layer 306 to output a result. The RNN 300 operates based on time-steps. The state of the RNN 300 at a given time step is influenced based on the previous time step via the feedback mechanism 305. For a given time step, the state of the hidden layers 304 is defined by the previous state and the input at the current time step. An initial input ($x_1$) at a first time step can be processed by the hidden layer 304. A second input ($x_2$) can be processed by the hidden layer 304 using state information that is determined during the processing of the initial input ($x_1$). A given state can be computed as $s_t=f(Ux_t+Ws_{t-1})$, where U and W are parameter matrices. The function ƒ is generally a nonlinearity, such as the hyperbolic tangent function (Tan h) or a variant of the rectifier function ƒ(x)=max(0,x). However, the specific mathematical function used in the hidden layers 304 can vary depending on the implementation of the RNN 300.

In addition to the CNN 100 and RNN 300 networks described, variations on those networks can be enabled. One example RNN variant is a long short-term memory (LSTM) RNN. LSTM RNNs can learn long-term dependencies t0 process longer sequences of language, for example. A variant on the CNN is a convolutional deep belief network, which has a structure similar to a CNN and is trained similar to a deep belief network. A deep belief network (DBN) is a generative neural network that includes multiple layers of stochastic (random) variables. DBNs can be trained layer-by-layer using greedy unsupervised learning. Learned weights of the DBN can then be used to provide pre-train neural networks by determining an optimal initial set of weights for the neural network, for example.

Figure 4:
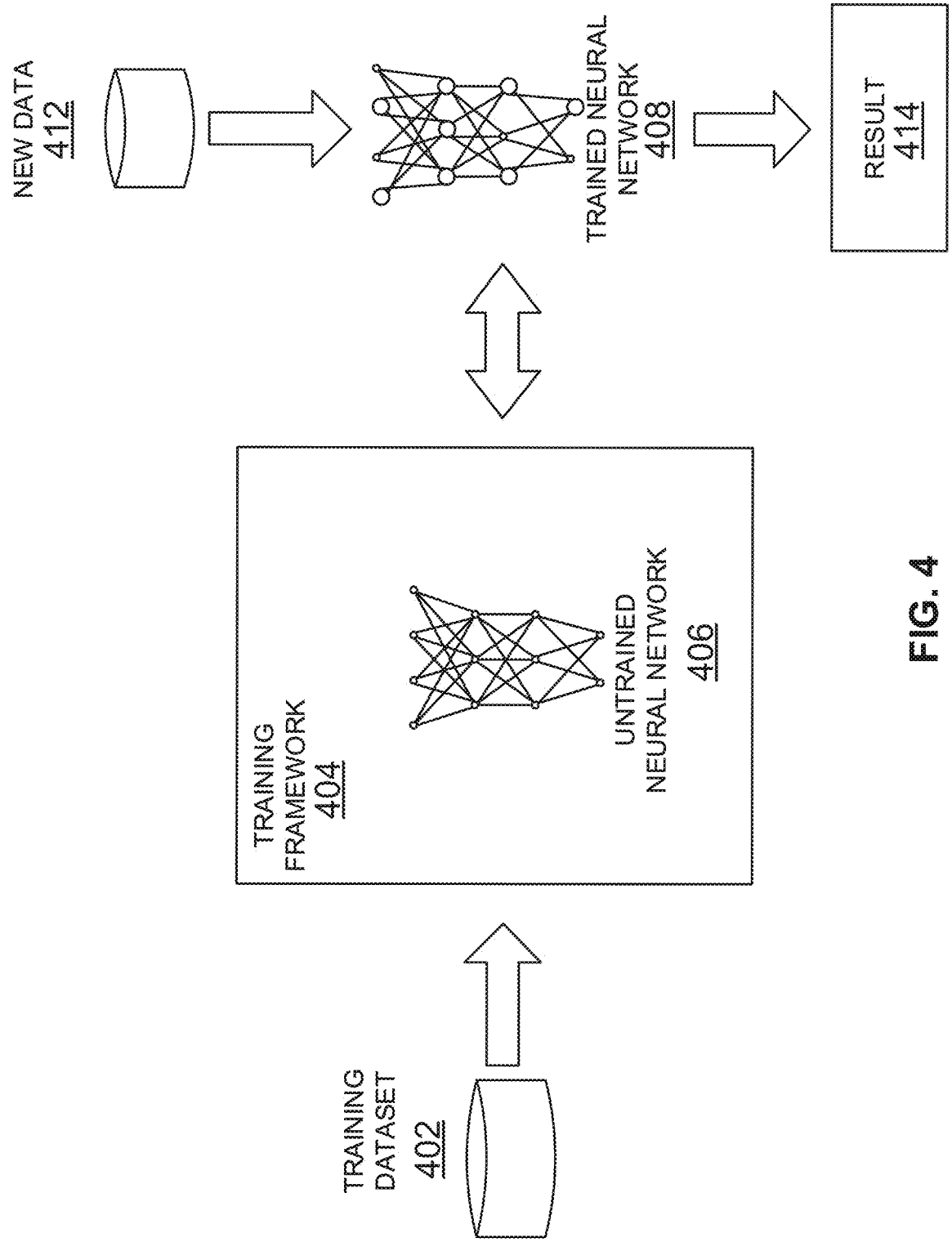
FIG. 4 illustrates example training and deployment of a deep neural network.

FIG. 4 illustrates example training and deployment of a deep neural network. Once a given network 100, 300 has been structured for a task, the neural network is trained using a training dataset 402. Various training frameworks have been developed to enable hardware acceleration of the training process. For example, a machine learning framework can be configured as a training framework 404. The training framework 404 can connect to an untrained neural network 406 and enable the untrained neural network 406 to be trained to generate a trained neural network 408. To start the training process, initial weights can be chosen randomly or by pre-training using a deep belief network, for example. The training cycle then can be performed using either supervised or unsupervised learning.

Supervised learning is a learning method in which training is performed as a mediated operation, such as when the training dataset 402 includes input paired with the desired output for the input, or when the training dataset includes input having known output and the output of the neural network is manually graded. The network processes the inputs and compares the resulting outputs against a set of expected or desired outputs. Errors are then propagated back through the system. The training framework 404 can adjust to adjust the weights that control the untrained neural network 406. The training framework 404 can provide tools to monitor how well the untrained neural network 406 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural network 408. The trained neural network 408 can then be deployed to implement any number of machine learning operations.

Unsupervised learning is a learning method in which the network attempts to train itself using unlabeled data. Thus, for unsupervised learning, the training dataset 402 includes input data without any associated output data. The untrained neural network 406 can learn groupings within the unlabeled input and can determine how individual inputs are related to the overall dataset. Unsupervised training can be used to generate a self-organizing map, which is a type of trained neural network 408 that can perform operations useful in reducing the dimensionality of data. Unsupervised training can also be used to perform anomaly detection, which allows the identification of data points in an input dataset that deviate from the normal patterns of the data.

Variations on supervised and unsupervised training can also be employed. Semi-supervised learning is a technique in which in the training dataset 402 includes a mix of labeled and unlabeled data of the same distribution. Incremental learning is a variant of supervised learning in which input data is continuously used to further train the model. Incremental learning enables the trained neural network 408 to adapt to new data 412 without forgetting the knowledge instilled within the network during initial training to provide a result 414.

Whether supervised or unsupervised, the training process for particularly deep neural networks may be too computationally intensive for a single compute node. Instead of using a single compute node, a distributed network of computational nodes can be used to accelerate the training process.

In certain examples, an incremental network quantization strategy is provided to convert a pre-trained full-precision deep neural network model into a lossless low-precision version of that model. This strategy is further improved through a different weight partition strategy, quantization goals, and optimization formulations provided through explicit-loss-error-aware quantization. By determining a loss error as the low-precision network model is formed from the full-precision network model, the composition, quality, and effectiveness of the low-bit, low-precision network model can be improved.

Incremental Network Quantization (INQ)

Deep Neural Networks (DNNs) have demonstrated results in a variety of artificial intelligence fields. For example, e.g., in computer vision using deep CNNs have been used successfully in computer vision, and deep RNNs have been used successfully in speech recognition. However, existing DNN architectures tend to have a large number of stacked layers and a large number of learnable parameters, resulting in heavy burdens on model storage and computation resources. As a result, deploying them on mobile/embedded devices is very challenging.

Efforts have been made to increase speed and compression ratios on DNNs during training and/or feed-forward inference operations. Some methods such as Vector Quantization (VQ), HashedNet, and Network Pruning (NP) try to remove parameter redundancy in pre-trained DNN models. Such techniques work well on fully connected layers but exhibit poor performance on convolutional layers of pre-trained DNN models, and the parameters in the resulting DNN models are still floating-point values. Recently, diverse efforts have been invested to restrict full-precision DNN models into low-precision versions, either in the feed-forward inference phase or in the training phase. These efforts include BinaryNet, XNOR-Net, Ternary Weight Network (TWN), DoReFa-Net and Quantized Neural Network (QNN). However, these efforts suffer from at least two major problems: (1) non-negligible accuracy loss and (2) unstable convergence across different DNN architectures. Additionally, these approaches all adopt a global strategy in which all the weights of a full-precision DNN model are simultaneously converted to low-precision ones. That is, they have not considered the different importance of network weights, leaving no room to retain network accuracy and enjoy easy convergence.

To address these and other issues, Incremental Network Quantization (INQ) can be targeted to convert a pre-trained full-precision (e.g., 32-bit floating-point) DNN model into a lossless low-precision version in which the weights are constrained to be either powers of two or zero with low bit-width (e.g., 5-bit, 4-bit, 3-bit and 2-bit ternary).

Unlike existing DNN quantization methods which adopt a global strategy to process all network weights simultaneously, INQ techniques described herein utilize a weight-importance-aware technology. Further, INQ techniques described herein utilize three interdependent operations: weight partition, group-wise quantization and re-training. With a compact combination of these three operations, an incremental network quantization and accuracy enhancement framework is presented to get a lossless low-precision DNN model from any full-precision reference.

Certain examples provide INQ including three interdependent operations: weight partition, group-wise quantization, and re-training. Weight partition uses a pruning measure to divide the weights in each layer of a pre-trained full-precision DNN model into two disjoint groups that play complementary roles in the INQ. The weights in the first group are quantized to be either powers of two or zero by a variable-length encoding method, forming a low-precision base for an original model. The weights in the other group are re-trained while keeping the quantized weights fixed, compensating for the accuracy loss resulting from the quantization. These three operations (weight partitioning, group-wise quantization, and re-training) are repeated on the latest re-trained weight group iteratively until all the weights are quantized. Thus, the three operations act as an incremental network quantization and accuracy enhancement procedure.

The INQ techniques described herein can resolve aforementioned issues and perform well on an ImageNet large scale classification task using known DNN models including AlexNet, VGG-16, GoogLeNet and ResNets. Specifically, techniques employing 5-bit, 4-bit and 3-bit low-precision models (re-trained with 8-16 epochs, e.g., 1-2 days on a GPU) have improved or almost same accuracy compared with 32-bit full-precision models. Even for 2-bit ternary models, the accuracy of techniques described herein meets or exceeds other ternary and binary results with significant margins (>2.9%/4.2%) in top-5/top-1 recognition rate.

INQ techniques described herein adopt a variable-length encoding. For example, INQ techniques can use 5-bit quantization: 1 bit for representing zero value, and the remaining 4 bits represent at most 16 different values for the powers of two. Similarly, for other n-bit quantization, 1 bit is used to represent a zero value, and the other n−1 bits are used to represent at most $2^{(n-1)}$ different values of powers of two. INQ techniques described herein have the property of easy convergence in training. In general, re-training with less than 8 epochs (~1 day on a GPU) can consistently generate a lossless model with 5-bit weights for AlexNet, VGG-16, GoogLeNet and ResNets. In INQ techniques described herein, the original floating-point operations can be replaced by cheaper binary bit shift operations on dedicated hardware such as a field programmable gate array (FPGA), etc.

Figure 5:
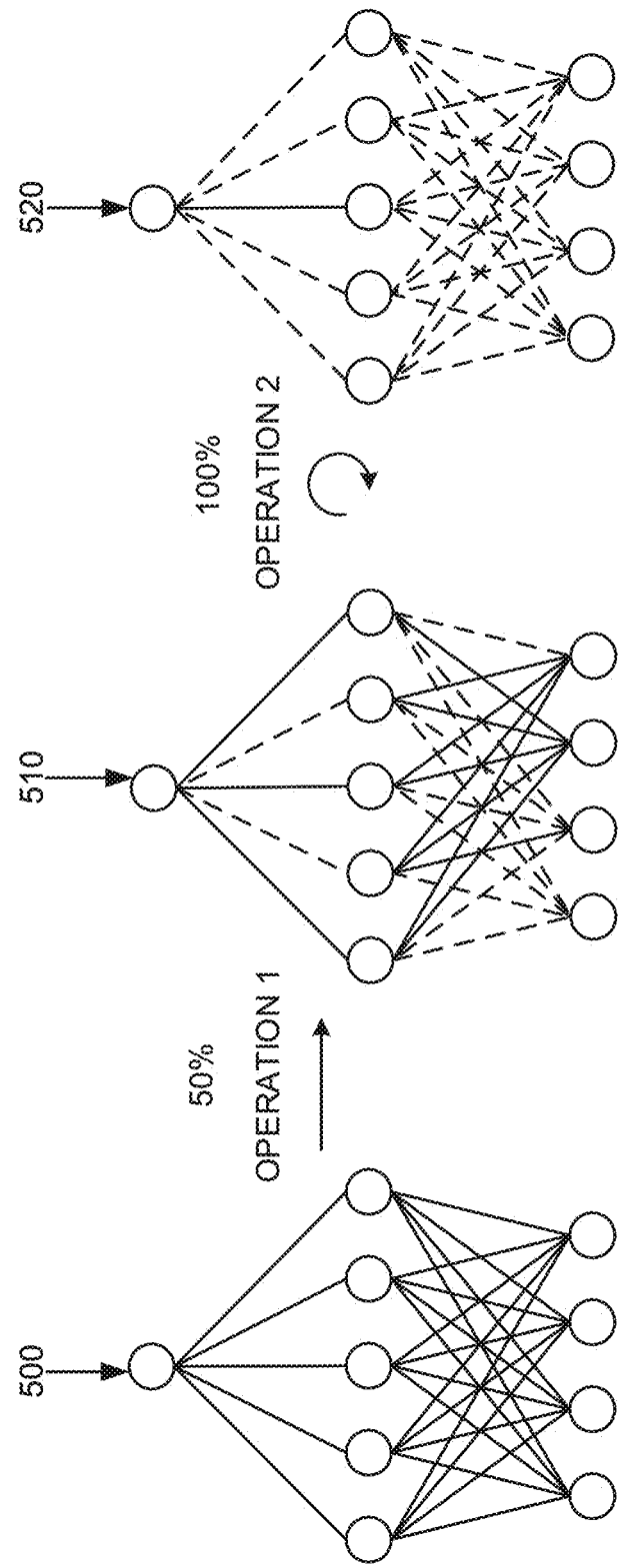
FIGS. 5A-5C depict an overview of an example incremental network quantization method.

FIGS. 5A-5C depict an overview of an example incremental network quantization method. FIG. 5A depicts a pre-trained full-precision model 500 used as a reference. FIG. 5B presents an updated model 510 with three proposed operations: weight partition, group-wise quantization (indicated by dashed connections) and re-training (indicated by solid connections). FIG. 5C presents a low-precision model 520 with all the weights constrained to be either powers of two or zero. In FIGS. 5A-5C, operation (1) represents a single run to generate the model 510 illustrated in FIG. 5B and operation (2) denotes a repeating of operation (1) on a latest re-trained weight group until all non-zero weights are quantized.

The example model processing method reflected in FIGS. 5A-5C does not lead to accuracy loss when using 5-bit, 4-bit and even 3-bit approximations in network quantization. In FIGS. 5A-5C, a three-layer, fully-connected network is used as an example, and the newly re-trained weights are divided into two disjoint groups of the same size at each run of operation (1), except the last run which only performs quantization on the re-trained floating-point weights occupying 12.5% of the model weights, for example. Thus, FIGS. 5A-5C illustrate an overview of an INQ for learning a lossless low-bit DNN model from a pre-trained full-precision reference on-the-fly. The final low-precision models are efficient both for memory and computation, for example.

Figure 6:
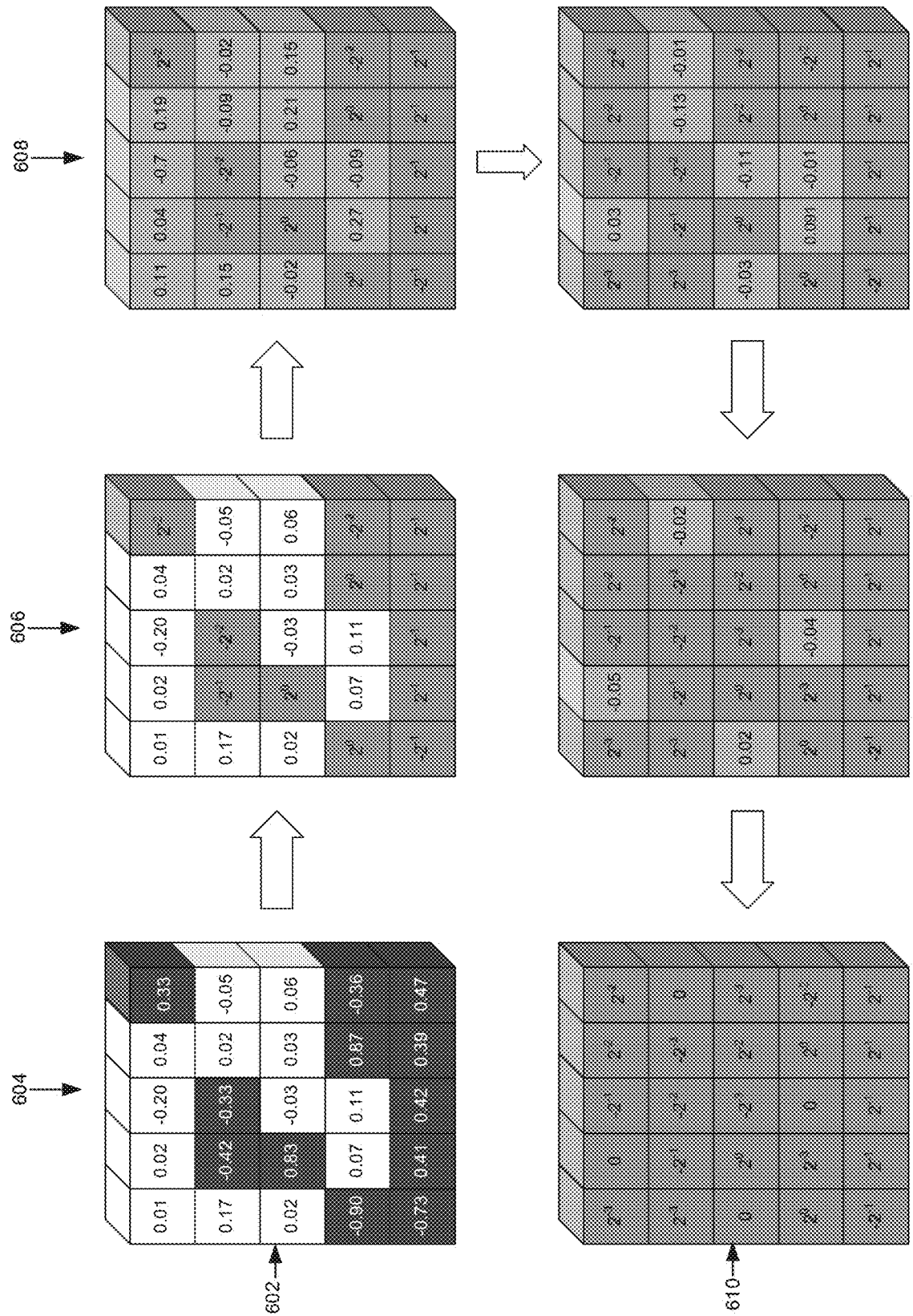
FIG. 6 illustrates example model weights resulting from iterative incremental network quantization such as according to the example of FIGS. 5A-5C.

FIG. 6 illustrates example model weights resulting from iterative INQ such as according to the example of FIGS. 5A-5C. Referring to the example of FIG. 6, a first row 602 illustrates results from a first iteration of the weight partition, group-wise quantization, and re-training operations. A top left cube 604 illustrates a weight partition operation generating two disjoint groups. A middle cube 606 illustrates a quantization operation on a first weight group, in which shaded cells are represented in powers of two. A top right cube 608 illustrates a re-training operation on a second weight group (e.g., the shaded cells). A second row 610 depicts results from the second, third, and fourth iterations of the INQ. In the example of FIG. 6, the accumulated portion of the weights that have been quantized undergoes from 50%→75%→87.5%→100%.

Explicit Loss-Error-Aware Quantization (ELQ)

Alternatively or in addition to the INQ techniques disclosed above, explicit loss-error-aware quantization can improve conversion of a full-precision DNN model to a low-bit, low-precision DNN model without loss of accuracy and utility in the low-bit model. Focusing on ultra-low-bit DNN quantization, certain examples address the problem of how to train DNN models whose weights are forced to be very low-bit values, such as ternary and binary values, without noticeable loss of model accuracy when compared with full-precision (e.g., 32-bit floating-point) counterpart models. By representing DNN models with very low-bit parameter values such as $\{-1, 0, 1\}$ and $\{-1, 1\}$ multiplied with layer-wise scaling factors, certain examples provide great benefits to applications of DNN solutions, especially on specialized deep learning hardware where originally time intensive multiplication operations can be replaced by simple bit-shift and accumulation operations, for example.

Certain examples provide Explicit Loss-Error-Aware Quantization (ELQ) to enhance deep learning and other artificial intelligence solutions in hardware design, software development, and applications. ELQ differs from prior solutions both in optimization formulation and in quantization strategy, for example.

Unlike methods that usually pose the problem as a straightforward approximation problem (e.g., minimizing the error of the layer-wise weights or inner products of the weights and the inputs between the original and respective quantized models) in the quantization, ELQ jointly and explicitly regularizes the weight approximation error and the accompanying loss perturbation. ELQ can be used to train lossless ultra-low-bit DNNs with binary or ternary weights, for example. To train lossless quantized models, ELQ can be bridged with an incremental quantization strategy.

Extensive experiments on the ImageNet large scale 1-$k$ classification task using two mainstream convolutional neural network families (e.g., fully convolutional and non-fully convolutional such as AlexNet and ResNet) show the leading performance of ELQ. For example, binary AlexNet and ternary binary ResNet-18 models using ELQ outperform DoReFa-Net, TWN, TTQ, and XNOR-Net with margins of 2.61%, 2.25%, 3.55% and 4.95% in top-1 recognition rate, respectively.

In certain examples, a full-precision (e.g., 32-bit floating-point) DNN model can be denoted as $\{M=f(W_l; X_l) | 1 \leq l \leq L\}$, where $W_l$ is a weight set of an l-th layer, $X_l$ is an input set of the l-th layer, and L is a number of layers in the DNN model M. To simplify the explanation, only convolutional layers and fully connected layers of CNNs can be considered, and dimension difference can be omitted in the expression. Usually, for the convolutional layers, $W_l$ is a four dimensional (4D) tensor and $X_l$ is a three dimensional (3D) tensor. For the fully connected layers, $W_l$ is a two dimensional (2D) matrix and $X_l$ is either a 2D matrix (obtained by reshaping a 3D tensor) or a one dimensional (1D) vector. In certain examples, DNN model M is constrained to only have very low-bit weight set $\hat{W}_l$ whose entries include $Q_l = \{\alpha_j c_k | 1 \leq k \leq K\}$. Here, for the 1-th layer, $\alpha_j$ is a corresponding positive scaling factor that needs to be determined during training, $c_k$ is an integer value, and K is a number of quantized weight centers. Specifically, for binary networks, $c_k \in \{-1, 1\}$, while for ternary networks, $c_k \in \{-1, 0, 1\}$.

In contrast, other approaches, such as BWNs, TWNs, DoReFa-Net, XNOR-Net, TTQ, etc., can be grouped into two families of solutions: 1) solutions that directly approximate full-precision weight sets with binary or ternary versions on a layer-by-layer basis or 2) solutions that approximate inner products of layer-wise weight sets and input sets. The first solution family directly approximates full-precision weight sets with layer-by-layer binary or ternary weight sets as follows:

$$\min_{\hat{W}_l} \|W_l - \hat{W}_l\|^2 \tag{1}$$

$$\text{s.t. } \hat{W}_l \in \{a_l c_k | 1 \leq k \leq K\}, 1 \leq l \leq L.$$

The second solution family considers an N approximation of the inner products of the layer-wise weight sets and input sets as follows:

$$\min_{\hat{W}_l} \|W_l X_l - \hat{W}_l X_l\|^2 \tag{2}$$

$$\text{s.t. } \hat{W}_l \in \{a_l c_k | 1 \leq k \leq K\}, 1 \leq l \leq L.$$

Another approach involves a proximal Newton algorithm based quantization method that directly minimizes loss with respect to quantized weights. This optimization problem can be defined as follows:

$$\min_{\hat{W}_l} L(\hat{W}_l) \tag{3}$$

$$\text{s.t. } \hat{W}_l \in \{a_l c_k | 1 \leq k \leq K\}, 1 \leq l \leq L.$$

Here, a loss function L with respect to the quantized weights at iteration t is defined as:

$$L(\hat{W}^{(t)}) = L(\hat{W}^{(t-1)}) + J^{(t-1)}(\hat{W}^{(t)} - \hat{W}^{(t-1)}) + \tfrac{1}{2}(\hat{W}^{(t)} - \hat{W}^{(t-1)})^T H^{(t-1)} (\hat{W}^{(t)} - \hat{W}^{(t-1)}), \tag{4}$$

where $J^{(t-1)}$ and $H^{(t-1)}$ are Jacobian and Hessian matrices with respect to the quantized weights at iteration t−1.

From an optimization perspective, the aforementioned approximation-based DNN quantization methods have at least two main drawbacks. First, regularizing respective approximation error causes noticeable perturbation on the classification loss, which impacts the predication accuracy of the quantized DNN model. However, loss perturbation has not been considered in these methods because the models usually assume that derivatives of a loss function with respect to the full-precision and quantized weights are exactly the same. Second, for these methods, there still exist noticeable accuracy gaps between the full-precision model and very low-bit models. For example, proximal Newton algorithm needs to estimate the Hessian matrix of the loss function with respect to the quantized weights and the inputs, bringing unacceptable computational complexity which prohibits use in the training with a large-scale dataset such as ImageNet. Further, loss difference between the quantized model and the full-precision counterpart is not considered.

Unlike the optimization methods analyzed above, ELQ defines the optimization problem as follows:

$$\min_{\hat{W}_l} L(\hat{W}_l) + a_1 L_p(W_l, \hat{W}_l) + a_2 E(W_l, \hat{W}_l) \quad (5)$$

$$\text{s.t. } \hat{W}_l \in \{a_l c_k \mid 1 \le k \le K\}, 1 \le l \le L.$$

While prior methods only consider the loss function with respect to the quantized model at a feed-forward stage during training, ELQ described herein evaluates L, which is a basic loss function with respect to the original full-precision model, and ELQ retains the loss function with respect to the full-precision model. $L_p$ encodes a loss difference between the quantized and full-precision models, E represents an approximation error between the quantized weight sets and the full-precision counterparts, and $a_1$ and $a_2$ are two positive coefficients balancing the regularization.

In certain examples, $E=\|W_l - \widehat{W}\|^2$, which allows that term to be dropped from Equation (5). Thus, $L_p$ is to be determined, which can be defined as:

$$L_p(W_l, \widehat{W}) = |L(W_l) - L(\widehat{W})|. \quad (6)$$

An absolute approximation difference, $\delta$, can be denoted as:

$$\delta = |W_l - \widehat{W}|. \quad (7)$$

In certain examples, a first order Taylor expansion of the loss function perturbation $L_p$ can be determined by flattening $L(W_l)$ with respect to $W_l$, and deriving:

$$L_p(W_l, \hat{W}_l) = \left| L(W_l) - L(W_l) - \frac{\partial L}{\partial (W_l)}(\hat{W}_l - W_l) \right| \quad (8)$$
$$= \left| \frac{\partial L}{\partial (W_l)}(W_l - \hat{W}_l) \right|$$
$$= \left| \frac{\partial L}{\partial (W_l)} \right| \delta.$$

In certain examples, for ease of implementation, a linear assumption $$\frac{\partial L}{\partial (W_l)} \propto \delta$$

can be used. With this linear assumption, the loss difference term $L_p$ and the approximation error term E can be reshaped into a uniform expression. Accordingly, for the optimization problem defined in Equation (5), the following weight update scheme can be derived:

$$W_l^t = W_l^{t-1} - \gamma \frac{\partial L}{\partial (W_l^{t-1})} - \lambda \text{sign}(W_l^{t-1} - \hat{W}_l^{t-1}). \quad (9)$$

where $\gamma$ is a positive learning rate, $\lambda$ is a positive coefficient, and sign(x) is a sign function.

As described above, ELQ provides several advantages beyond prior methods for quantization and network training. For example, prior methods assume $L(W_l) = L(\widehat{W})$, as shown in Equations (1)-(3). As shown in Equation (5), aside from the weight approximation error (e.g., the third term in Equation (5)), $L(W_l)$ is used instead of $L(\widehat{W})$ as the first term to emphasize their differences. Additionally, a loss difference between the quantized and full-precision models is used as the second term in Equation (5) to encode loss perturbation from the weight quantization, which is used to obtain Equation (9) for weight update. On one hand, the full-precision version of network weights is retained during training and updated at a backward propagation stage. From this perspective, $W_l$ is a variable to be optimized. On the other hand, the updated weights are quantized at a feed-forward stage. From this perspective, $\widehat{W}$ is the final variable to be optimized. After the weight sets are updated at iteration t, the respective low-bit ternary or binary equivalents can be obtained when the corresponding optimal scaling factor set $\{\alpha_l\}$ can be determined. For example, scaling factor $\alpha_l$ can be computed as $$\alpha_l = \text{mean}(W_l) + \beta \max(W_l), \quad (10)$$

where $\beta$ is a positive coefficient (e.g., set empirically to $\beta=0.05$, etc.).

Ternary and Binary Quantization with ELQ

Based on Equations (5)-(10), ELQ can be used for low-bit ternary and/or binary quantization of network weights. A ternary quantization of a weight set $W_l$ can be defined as follow:

$$\hat{W}_l = \begin{cases} \alpha_l & \text{if } W_l > 0.5\alpha_l \\ -\alpha_l & \text{if } W_l < -0.5\alpha_l \\ 0 & \text{otherwise} \end{cases}, \quad (11)$$

and a binary quantization of a weight set $W_l$ can be directly determined by taking the sign of the full-precision weight values as follows:

$$\hat{W}_l = \begin{cases} \alpha_l & \text{if } W_l \ge 0 \\ -\alpha_l & \text{otherwise} \end{cases}. \quad (12)$$

INQ Plus ELQ

In certain examples, since ELQ jointly considers a weight approximation error and an accompanying quantization impact to a loss function for very low-bit DNN quantization problem, ELQ provides advantages in suppressing potential accuracy loss of quantized DNN models in comparison to other quantization methods.

To further enhance the accuracy of a quantized model, ELQ can be bridged with an extension of INQ. For example, first, weights of each layer of a DNN model can be separated into two disjoint groups. Then, the weights in one group are directly quantized and fixed, and the weights of the other group retaining 32-bit, full-precision floating-point values are re-trained to compensate for model accuracy loss resulting from the quantization. The operations of weight partition, group-wise quantization and re-training are repeated until all network weights are quantized. Thus, ELQ can be bridged with an incremental quantization strategy. Then, weight partition can be performed, and very low-bit DNNs can be trained.

For example, let $T_l$ be a binary matrix having a same dimension as $W_l$, let $W_a$ be a weight group that is to be quantized, and let $W_b$ be a weight group that is to be re-trained. Weight groups $W_a$ and $W_b$ can then be defined as follows:

$$W_a \cup W_b = W_l, \text{ and } W_a \cap W_b = \emptyset \quad (13)$$

For the l-th layer, a weight partition can be defined as:

$$T_l = \begin{cases} 0 & \text{if } W_l \odot T_l \in W_a \\ 1 & \text{if } W_l \odot T_l \in W_b \end{cases}, \quad (14)$$

where $\odot$ denotes a Hadamard product operator. By combing Equation (14) and Equation (9), a weight update scheme can be obtained for ELQ as follows:

$$W_l^t = W_l^{t-1} - \gamma \frac{\partial L}{\partial (W_l^{t-1})} \odot T_l - \lambda \text{sign}(W_l^{t-1} - \hat{W}_l^{t-1}) \odot T_l. \quad (15)$$

As shown in Equations (14)-(15), the binary matrix $T_l$ forces quantized weights to be fixed. In other words, only weights still having 32-bit floating-point values are re-trained to enhance network model accuracy. Weight partitioning is also to be performed.

In some examples, INQ uses a magnitude-based weight partition method in which weights with larger magnitudes are grouped into the set to be quantized, while the other weights are considered to be re-trained. However, this magnitude-based weight partition method is empirically studied.

In other examples, ELQ uses a new weight partition strategy. In a low-bit ternary or binary DNN quantization task, a solution can be improved if network weights are trained to be close to a number of target weight centers in comparison to a situation in which network weights are scattered with a flat distribution curve. For each layer of the DNN, an interval bound factor set $\{\sigma_n | 1 \le n \le N\}$ is defined in which $0 \le \sigma_n \le 1$. The factor set guides successive weight partition, quantization, and re-training operations. In certain examples, ELQ for training a lossless, low-bit ternary or binary DNN model on-the-fly to approximate a full-precision reference model can be implemented according to Algorithm 1 defined in Table 1 as follows:

TABLE 1

Example ELQ Network Training Algorithm 1.

Algorithm 1 Explicit Loss-error-aware Quantization for training a ternary or binary DNN.
Require: X: the training data, M = {$W_l$ : 1 ≤ l ≤ L}: the full-precision DNN model TABLE 1-continued Example ELQ Network Training Algorithm 1.

Ensure: $\hat{M}$ = {$\hat{W}_l$ : 1 ≤ l ≤ L}: the final low-precision model with weight set $W_l$ constrained to be ternary set {$-\alpha_l$, 0, $\alpha_l$} or binary set {$-\alpha_l$, $\alpha_l$}
1:  for l = 1, 2, . . . , L do
2:    Initialize $W_\alpha \leftarrow \emptyset$, $W_b \leftarrow W_l$, $T_l \leftarrow 1$
3:    Calculate ternary or binary scaling factor $\alpha_l$ by Equation (10)
4:    Set interval bound factors at successive partition steps as ($\sigma_1 = a, \sigma_2 = b, \ldots, \sigma_N = 0$)
5:    for n = 1, 2, . . . , N do
6:      Reset the base learning rate and the learning policy
7:      Start optimization and quantization
8:      Optimize the neural network w.r.t. the loss function
9:      Quantize weights into ternary or binary equivalents by Equation (11) or Equation (12)
10:     Calculate feed-forward loss w.r.t. the current model
11:     Update weights by Equation (15)
12:   end for
13: end for As shown in Table 1, the ELQ algorithm can be used to train a low-precision DNN model using training data and a corresponding full-precision DNN model. For each network layer l, weights $W_a$ and $W_b$ and binary matrix $T_l$ are initialized (e.g., $W_a \leftarrow \emptyset$, $W_b \leftarrow W_l$, and $T_l \leftarrow 1$), and a scaling factor is calculated based on $W_l$ as defined in Equation (10) above. Interval bound factors are set at successive partition steps or intervals (e.g., $\sigma_1$=a, $\sigma_2$=b, $\sigma_N$=0). Then, a quantization loop executes to determine network weights for the low-bit DNN model.

For n partition intervals, the base learning rate and learning policy are reset, and optimization and quantization of network weights begins. First, the DNN layer is optimized with respect to a loss or cost function. For example, the loss function seeks to optimize the DNN model by minimizing a "cost" or loss associated with given event or network value. Then, weights are quantized into low-bit ternary or binary equivalents using Equation (11) or Equation (12), respectively. A feed-forward loss or cost is then calculated with respect to the current DNN model. Using the determined loss and quantization, network weights are updated according to Equation (15), for example.

Figure 7:
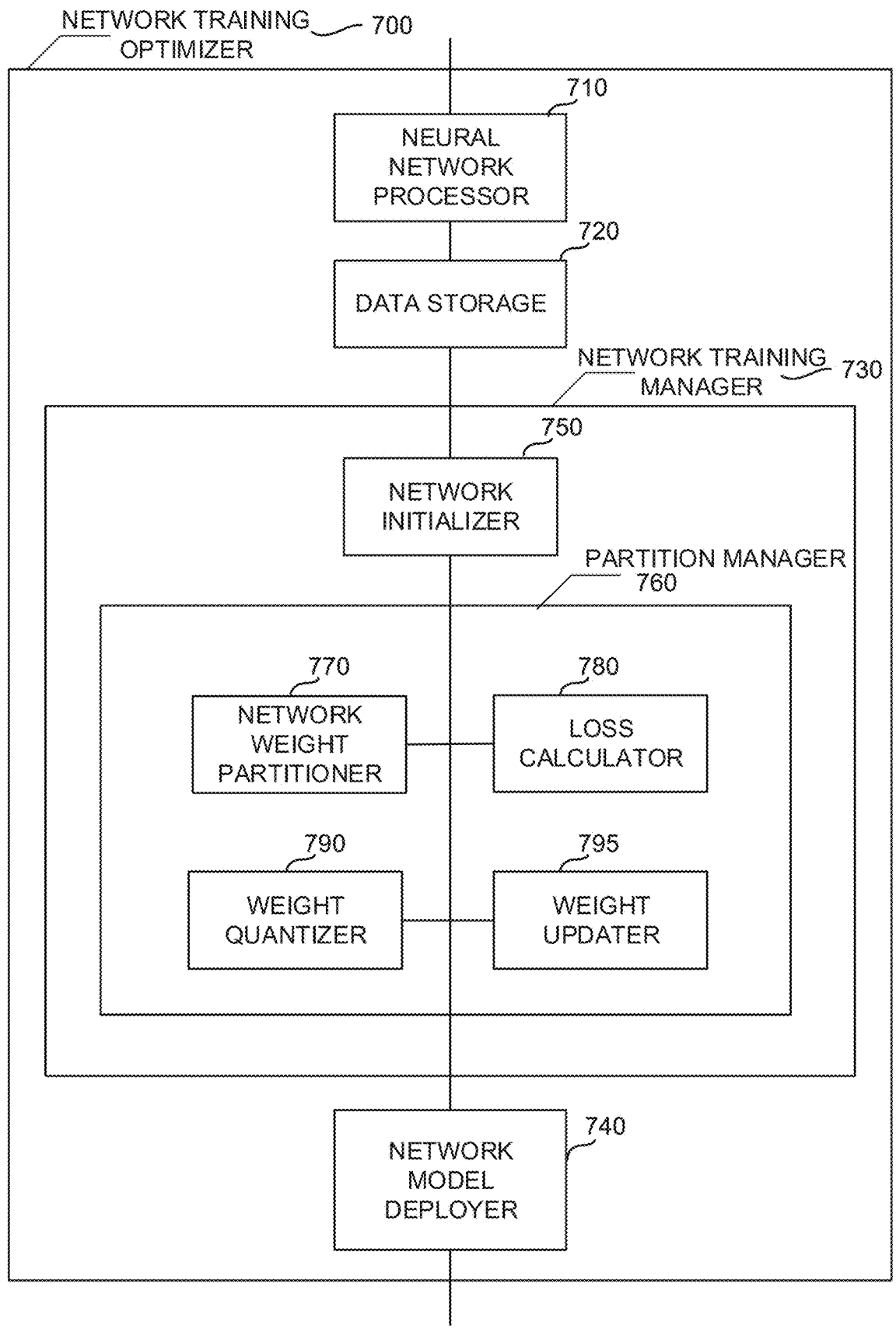
FIG. 7 is a schematic illustration of an example network training optimizer to train a low-bit neural network.

FIG. 7 is a schematic illustration of an example network training optimizer 700 to train a neural network, such as the example network(s) 100, 300, 500-530, of FIGS. 1-6. The example network training optimizer 700 can operate with and/or within the example training framework 404 of FIG. 4, for example. In the illustrated example of FIG. 7, the training optimizer 700 includes an example neural network processor 710, an example data storage 720, an example network training manager 730, and an example network model deployer 740. The example network training manager 730 includes an example network initializer 750 and an example partition manager 760. The example partition manager 760 includes an example network optimizer 770, an example loss calculator 780, an example weight quantizer 790, and an example weight updater 795.

In operation, the example neural network processor 710 acquires and/or otherwise retrieves a neural network, such as the example network(s) 100, 300, 500-530 of FIGS. 1-6, and initializes the acquired neural network. For example, a full-precision DNN model is retrieved and/or otherwise acquired along with a training data set to be stored in the data storage 720. The network processor 710 prepares a full-precision DNN model for generation a low-precision DNN model from the full-precision DNN model by compressing layers of the full-precision DNN and constraining weights of the low-precision DNN to be binary (e.g., $\{-\alpha_l, \alpha_l\}$) or ternary (e.g., $\{-\alpha_l, 0, \alpha_l\}$). As a result, a DNN represented using 32-bit, full-precision floating point numbers can also be reduced to a low 8-bit, 5-bit, 4-bit, 3-bit, etc., representation besides an ultra-low-bit 2-bit (ternary) and 1-bit (binary) representations, for example. The DNN model can be stored in the data storage 720, for example.

To quantize the weights of the low-precision DNN according to ELQ, the example network training manager 730 traverses each layer of the DNN and processes the weights associated with that layer. The example network initializer 750 of the network training manager 730 initializes weights $W_a$ and $W_b$ and binary matrix $T_l$ (e.g., $W_a \leftarrow \emptyset$, $W_b \leftarrow W_l$, and $T_l \leftarrow 1$) for each network layer l. The initializer 750 also calculates a scaling factor based on $W_l$ as defined in Equation (10). Further, the initializer 750 sets interval bound factors for successive partition steps or intervals (e.g., $\sigma_1 = a$, $\sigma_2 = b$, . . . , $\sigma_N = 0$). Then, the example partition manager 760 executes an ELQ loop to determine network weights for the low-bit DNN model.

The example network weight partitioner 770 partitions unquantized network weights into two groups: a first group to be quantized and a second group to be retrained. For each of n partition intervals of the DNN, the partition manager 760 resets the base learning rate and learning policy so that optimization and quantization of network weights can begin. The example loss calculator 780 optimizes the DNN with respect to a loss function. For example, the loss function (e.g., mean square error, absolute error, smooth absolute error, binary cross entropy, negative log likelihood, margin classifier, soft margin classifier, hinge error, cosine error, back propagation, etc.) is applied to the nodes and weights of the network layer to evaluate a difference between a predicted value and an actual value for the network model. The loss function seeks to optimize the DNN model by minimizing a "cost" or loss associated with given event or network value, for example.

In certain examples, the weight quantizer 790 quantizes network weights into low-bit ternary or binary equivalents using Equation (11) or Equation (12), respectively. The example loss calculator 780 calculates a loss, such as a feed-forward loss or cost, etc., with respect to the updated DNN model. Using a difference in the determined loss between the full-precision DNN and the updated low-bit DNN from the loss calculator 780 and the network weight quantization from the weight quantizer 790, the example weight updater 795 updates network weights according to Equation (15), for example.

Figure 8A:
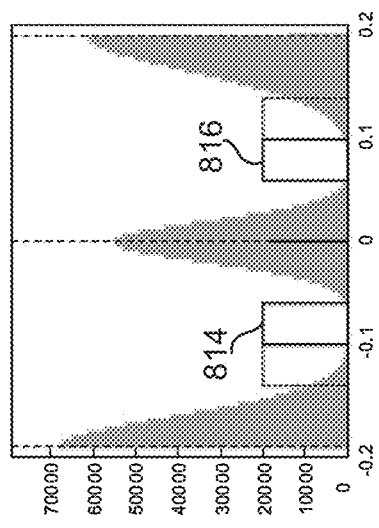
FIGS. 8A-8F depict an illustration of an example explicit loss-error-aware quantization for ternary deep neural network quantization.

FIGS. 8A-8F depict an illustration of an example ELQ for ternary DNN quantization. The example incremental strategy of FIGS. 8A-8F illustrates a ternary DNN quantization task with interval bound factors set at successive partition steps as follows: $\{\sigma_1 = 0.5, \sigma_2 = 0.4, \sigma_3 = 0.3, \sigma_4 = 0.2, \sigma_5 = 0.15, \sigma_6 = 0.1, \sigma_7 = 0.05, \sigma_8 = 0\}$. As shown in the example of FIG. 8A, three quantized centers 802, 804, 806 are determined layer-wise $\{\alpha_l c_k | 1 \leq k \leq 3\}$ by applying Equation (10) over a respective weight distribution and performing weight clip and re-training. Resulting centers of $\{-0.2, 0, 0.2\}$ are indicated with three dashed lines.

Figure 8B:
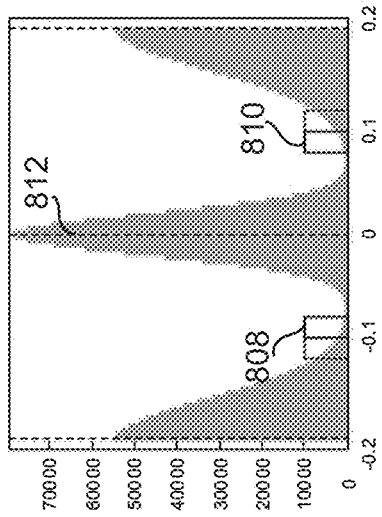

As shown in FIG. 8B, two pairs of $(\sigma_1 \alpha_l c_1, \sigma_2 \alpha_l c_1)$ and $(\sigma_1 \alpha_l c_3, \sigma_2 \alpha_l c_3)$ are calculated, followed by weights that fall into intervals of $[(2\sigma_1 - \sigma_2)\alpha_l c_1, \sigma_1 \alpha_l c_1)$, $[\sigma_1 \alpha_l c_1, \sigma_2 \alpha_l c_1) \cup [\sigma_2 \alpha_l c_3, \sigma_1 \alpha_l c_3)$, $[\sigma_1 \alpha_l c_3, (2\sigma_1 - \sigma_2)\alpha_l c_3)$ to be quantized into three respective center values, for example. In this example, $\sigma_1 = 0.5$, $\sigma_2 = 0.4$, $\alpha_l = 0.2$, $c_1 = -1$, and $c_3 = 1$, so the weights that fall into the ranges of $[-0.12, -0.1)$, $[-0.1, -0.08) \cup [0.08, 0.1)$, $[0.1, 0.12)$ (shown as rectangles 808, 810 around a center value 812 in the example of FIG. 8B) are quantized into $\{-0.2, 0, 0.2\}$, respectively, and fixed. The training is performed on the remaining full-precision weights with value clips, for example.

Figure 8C:
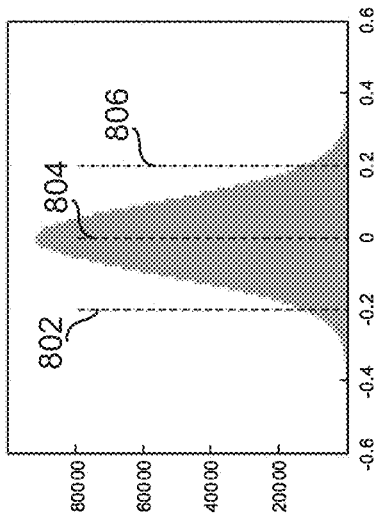
Figure 8D:
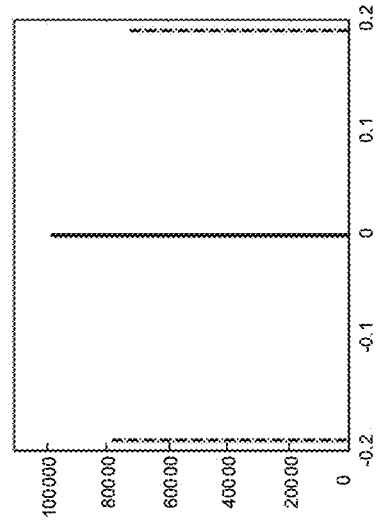
Figure 8E:
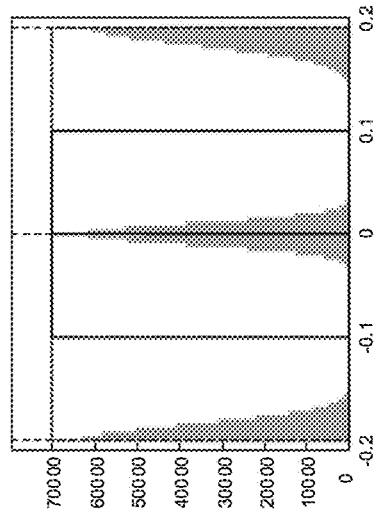
Figure 8F:
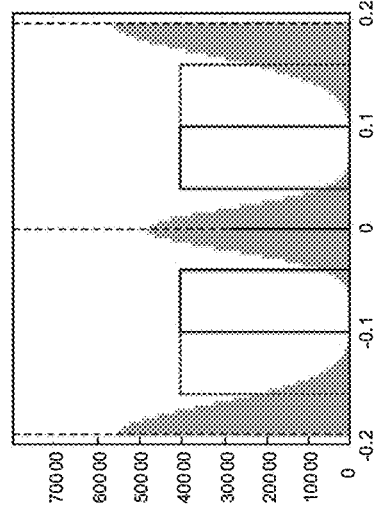

FIG. 8C shows an example of the training in which $\sigma_2 = \sigma_3$ and the weight interval operations (e.g., highlighted by rectangles 814, 816) described above with respect to FIG. 8B are repeated. FIGS. 8D-8F show results of successive actions executed until all network weights are quantized, reaching final convergence. In each of FIGS. 8D-8F, a horizontal axis denotes weight values and a vertical axis denotes an accumulated number of weights with the same values. Only one network layer is illustrated in the examples of FIGS. 8D-8F.

While an example implementation of the network training optimizer system 700 is illustrated in FIG. 7, one or more of the elements, processes and/or devices illustrated in FIG. 7 can be combined, divided, re-arranged, omitted, eliminated and/or implemented in any other way. Further, the example neural network processor 710, the example data storage 720, the example network training manager 730, the example network model deployer 740, the example network initializer 750, the example partition manager 760, the example network optimizer 770, the example loss calculator 780, the example weight quantizer 790, the example weight updater 795, and/or, more generally, the example network training optimizer 700 of FIG. 7 can be implemented by hardware, software, firmware and/or any combination of hardware, software and/or firmware. Thus, for example, any of the example neural network processor 710, the example data storage 720, the example network training manager 730, the example network model deployer 740, the example network initializer 750, the example partition manager 760, the example network optimizer 770, the example loss calculator 780, the example weight quantizer 790, the example weight updater 795, and/or, more generally, the example network training optimizer 700 of FIG. 7 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example neural network processor 710, the example data storage 720, the example network training manager 730, the example network model deployer 740, the example network initializer 750, the example partition manager 760, the example network optimizer 770, the example loss calculator 780, the example weight quantizer 790, the example weight updater 795, and/or, more generally, the example network training optimizer 700 of FIG. 7 is/are hereby expressly defined to include a non-transitory computer-readable storage device or storage disk such as a memory, a digital versatile disk (DVD), a compact disk (CD), a Blu-ray disk, etc. including the software and/or firmware. Further still, the example network training optimizer system 700 of FIG. 7 can include one or more elements, processes and/or devices in addition to, or instead of, those illustrated in FIG. 7, and/or may include more than one of any or all of the illustrated elements, processes and devices.

Figure 9:
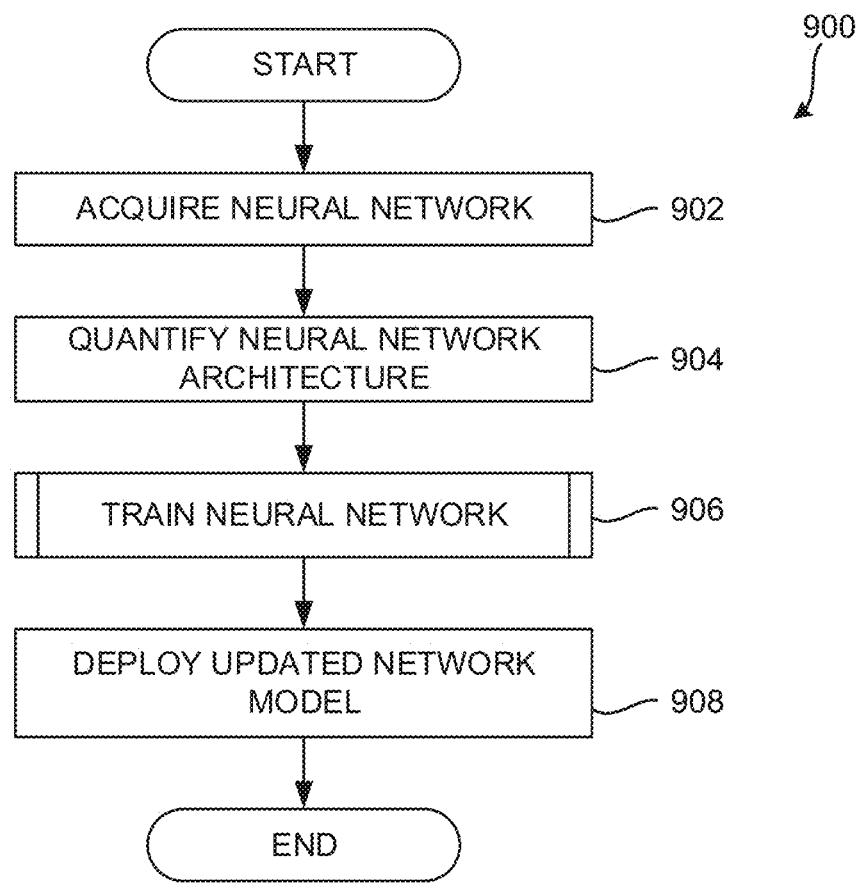
FIGS. 9-10 illustrate flow diagrams of example methods for training a low-bit neural network.
Figure 10:
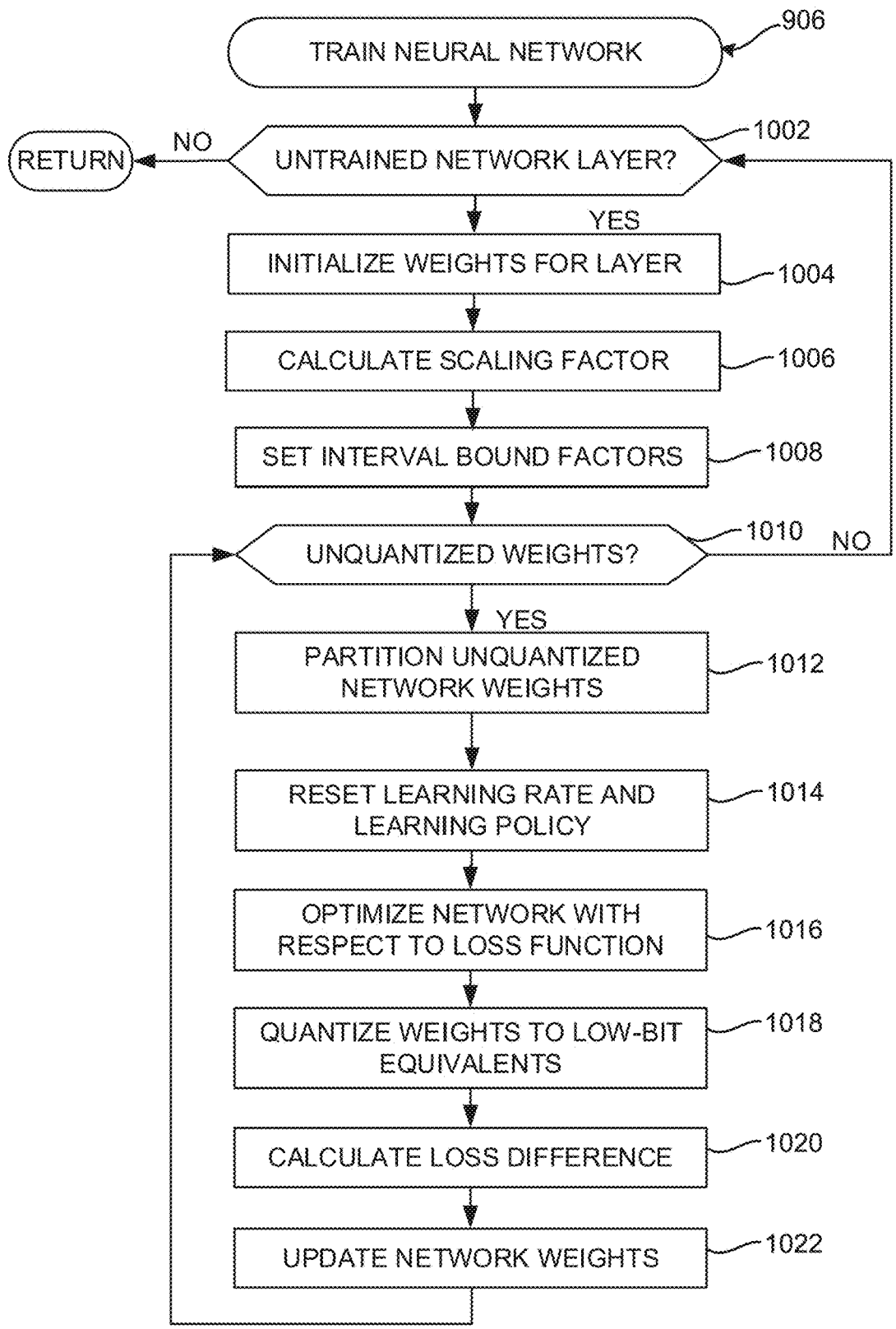

Flowcharts representative of example machine readable instructions for implementing the example network training optimizer 700 of FIG. 7 are shown in FIGS. 9-10. In this example, the machine-readable instructions include a program for execution by a processor such as a processor 1112 shown in the example processor platform 1100 discussed below in connection with FIG. 11. The program can be embodied in software stored on a non-transitory computer readable storage medium such as a CD-ROM, a floppy disk, a hard drive, a DVD, a Blu-ray disk, or a memory associated with the processor 1112, but the entire program and/or parts thereof can alternatively be executed by a device other than the processor 1112 and/or embodied in firmware or dedicated hardware. Further, although the example program is described with reference to the flowcharts illustrated in FIGS. 9-10, many other methods of implementing the example network training optimizer apparatus 700 of FIG. 7 can alternatively be used. For example, the order of execution of the blocks may be changed, and/or some of the blocks described can be changed, eliminated, or combined. Additionally or alternatively, any or all of the blocks can be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example process(es) of FIGS. 9-10 can be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc., can be present without falling outside the scope of the corresponding claim. As used herein, when the phrase "at least" is used as the transition term in a preamble of a claim, it is open ended in the same manner as the term "comprising" and "including" are open ended.

Example machine readable instructions for implementing the network training optimizer 700 of FIG. 7 and that can be executed to optimize network weights for a low-bit DNN model are illustrated in FIG. 9. With reference to the preceding figures and associated descriptions, the example machine readable instructions 900 begin at block 902.

At block 902, the example neural network processor 710 of the network training optimizer 700 acquires a neural network that is to be trained. A retrieved neural network is sometimes referred to as a backbone network and may include any number of layers, in which general industry parlance refers to a relatively high number of layers as a deep neural network (DNN). However, examples disclosed herein apply to neural networks having any number of layers. At block 904, the example neural network processor 710 quantifies and/or otherwise analyzes the retrieved neural network to extract and/or otherwise identify one or more characteristics therein. For example, the network processor 710 determines a number of layers, a number and/or type of shallow layer, a number and/or type of intermediate layer, a number and/or type of deep layer, a number of partitions with each layer, and/or an objective of the retrieved backbone network.

At block 906, the example network training manager 730 invokes a training process for the retrieved neural network to generate and train a low-bit version of the neural network. In certain examples, the retrieved neural network is already a low-bit neural network. In other examples, the retrieved neural network is a full-precision neural network, and a low-bit neural network model is formed from the full-precision network as part of the training process. In certain examples, network weights of the network model are divided or partitioned into a group of network weights to be quantized and a group of network weights to be re-trained, and the re-training partition of network weights repeats until all network weights have been quantized. A loss difference between quantized and full-precision models encodes a loss perturbation in the weight quantization and helps reduce error in approximating full-precision model weight values with a low-bit neural network model.

The example training process leverages the full-precision model and training data set to scale, optimize, quantize, and calculate loss for nodes in the network, resulting in updated network weights and an updated network model to be deployed, at block 908, for use in one or more applications such as mobile or embedded device applications, etc.

FIG. 10 illustrates a flow diagram representing example machine readable instructions to train a neural network (e.g., block 906 of the example method of FIG. 9). At block 1002, each layer of the input neural network is processed and trained. For example, to quantize the weights of the full-precision DNN according to ELQ, the example network training manager 730 traverses each layer of the DNN and processes the weights associated with that layer.

At block 1004, network node and/or connection weights are initialized. For example, the example network initializer 750 of the network training manager 730 initializes weight groups Wa and Wb and binary matrix $T_l$ (e.g., $W_a \leftarrow \emptyset$, $W_b \leftarrow W_l$, and $T_l \leftarrow 1$) for each network layer l. At block 1006, a scaling factor is calculated. For example, the initializer 750 calculates a scaling factor, $\alpha_l$, based on $W_l$ as defined in Equation (10). At block 1008, interval bound factors are set for partitions of the network layer. For example, interval bound factors can include $\{\sigma_1=a, \sigma_2=b, \ldots, \sigma_N=0\}$. Interval bounds are used to divide network weights into partitions, for example. At block 1010, the example initializer 750 executes an ELQ loop for unquantized weights in each of n partitions to determine network weights for the low-bit DNN model.

At block 1012, network weights are partitioned into two groups: a first group of network weights to be quantized and a second group of network weights to be re-trained. The partition can be based on the interval bound factors to group network weights around target weight centers, for example. Thus, the network weight partitioner 770 partitions unquantized network weights in the layer into a first group that is quantized and a second group that is re-trained (e.g., based on a loss function analysis, etc.) to be further partitioned iteratively until no unquantized weights remain. In certain examples, weights within range of a center value can be quantized to that center value to reduce network weights for ease of representation without sacrificing network accuracy.

For each partition, at block 1014, learning rate and learning policy are reset. Then, optimization and quantization begin. At block 1016, the neural network is optimized with respect to a loss function. For example, the loss calculator 780 applies the loss function (e.g., mean square error, absolute error, smooth absolute error, binary cross entropy, negative log likelihood, margin classifier, soft margin classifier, hinge error, cosine error, back propagation, etc.) to the nodes and weights of the particular network layer to evaluate a difference between a predicted value and an actual value for the network model. The loss function seeks to optimize the DNN model by minimizing a "cost" or loss associated with given event or network value, for example.

At block 1018, weights are quantized into low-bit equivalents. For example, network weights in the first group/partition of network weights are quantized into low-bit ternary or binary equivalents using Equation (11) or Equation (12), respectively. For example, network weights in the first partition group are examined by the weight quantizer 790

At block 1020, a loss is calculated with respect to the updated network model. For example, for network weights in the second group/partition of network weight, the example loss calculator 780 calculates a loss, such as a feed-forward loss or cost, etc., with respect to the reduced, low-bit DNN model. The loss calculation can capture/encode a difference between loss with respect to the full-precision network and loss with respect to the low-bit, reduced-precision network, for example. Thus, the loss calculation at block 1020 is different from the loss calculation at block 1016.

At block 1022, network weights are updated. For example, using the determined loss from the loss calculator 780 and the network weight quantization from the weight quantizer 770, the example weight updater 790 updates network weights according to Equation (15), for example. After all network weights have been quantized (e.g., no network weights remain to be partitioned), an updated, low-bit network model is generated. For example, a low-bit equivalent DNN is generated for deployment and use as a full-precision DNN would be.

Figure 11:
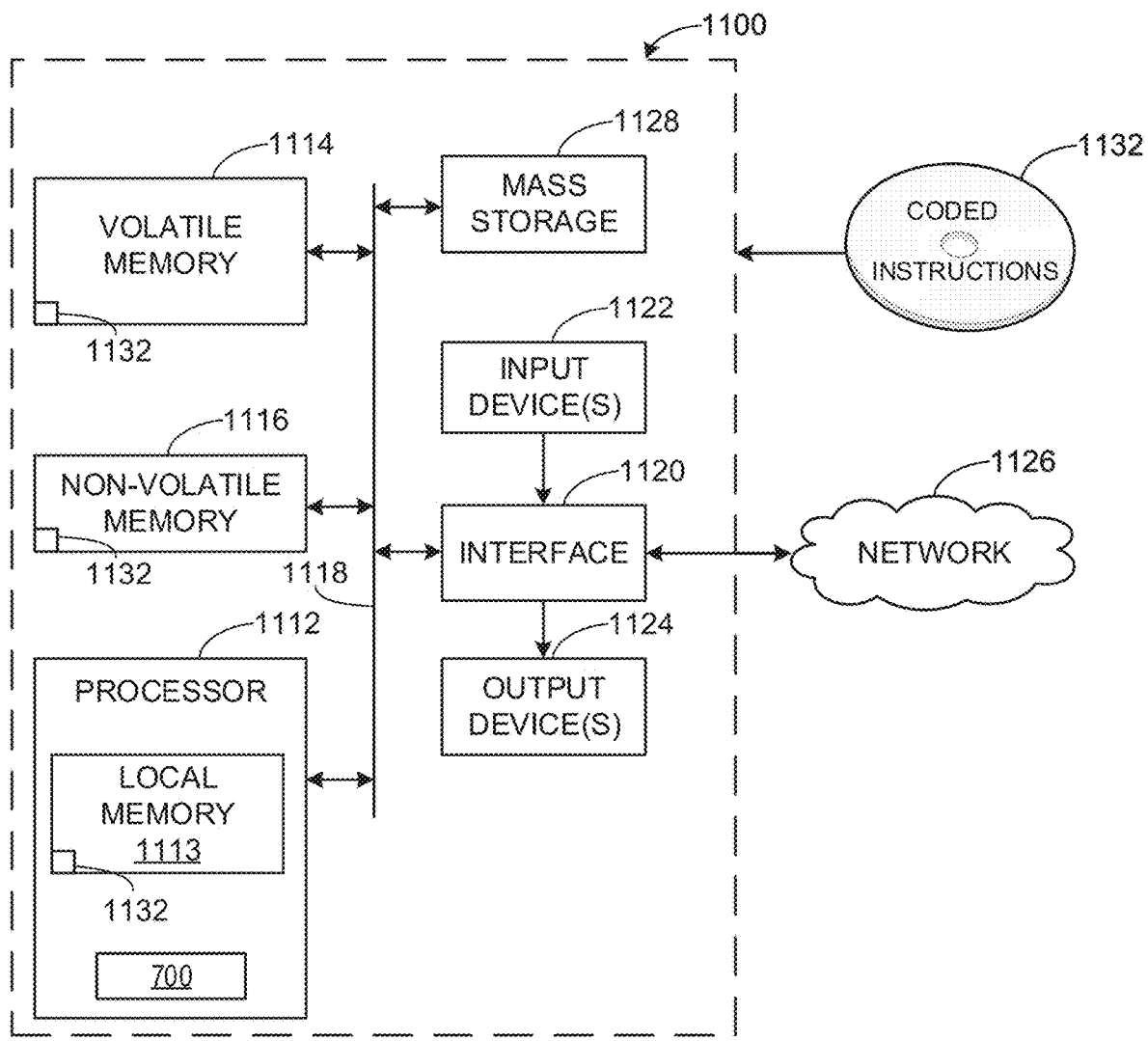
FIG. 11 is a block diagram of an example processor platform capable of executing the example instructions of FIGS. 9-10 to implement the example system of FIG. 7.

FIG. 11 is a block diagram of an example processor platform 1100 capable of executing the instructions of FIGS. 9-10 to implement the system of FIG. 7. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. In the illustrated example, the processor 1112 is structured to include the example network training optimizer 700 including the example neural network processor 710, the example data storage 720, the example network training manager 730, the example network model deployer 740, the example network initializer 750, the example network optimizer 760, the example weight quantizer 770, the example loss calculator 780, the example weight updater 790, etc.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM), 3D XPoint (such as Intel Optane™, Micron QuantX™, etc.) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a peripheral component interconnect (PCI) express interface.

In the illustrated example, one or more input devices 1122 are connected to the interface circuit 1120. The input device(s) 1122 permit(s) a user to enter data and commands into the processor 1112. The input device(s) 1122 can be implemented by, for example, an audio sensor, a microphone, a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 9-10 can be stored in the mass storage device 1128, in the volatile memory 1114, in the non-volatile memory 1116, and/or on a removable tangible computer readable storage medium such as a CD or DVD.

From the foregoing, it will be appreciated that the above disclosed methods, apparatus and articles of manufacture facilitate improved training of very low-bit network models such as DNNs, etc., with negligible loss of predication accuracy compared with full-precision counterpart models. The disclosed methods, apparatus and articles of manufacture improve the efficiency of using a computing device by generating a neural network model that has high accuracy yet low-bit value representation using new training and manipulation of network weights. The disclosed methods, apparatus and articles of manufacture are accordingly directed to one or more improvement(s) in the functioning of a computer.

Certain examples take a full-precision DNN as a reference and jointly consider loss perturbation and weight approximation error in optimizing weights of the low-bit DNN network model. Additionally, an incremental quantization strategy is applied with the joint weight optimization to provide lossless DNN quantization. Thus, a negative quantization impact on predication accuracy can be well suppressed and drawbacks of second-order optimization methods (e.g., Jacobian and Hessian matrices, etc.), such as expensive computational cost, etc., can be avoided when training very low-bit DNNs with large scale datasets. Certain examples leverage ELQ to provide low-bit binary and/or ternary quantization results on large-scale data sets for very low-bit DNNs and/or other neural networks.

Example 1 is an apparatus for loss-error-aware quantization of a low-bit neural network. The example apparatus includes a network weight partitioner to partition unquantized network weights of a first deep neural network model into a first group of network weights to be quantized and a second group of network weights to be retrained; a loss calculator to process network weights of the first deep neural network model to calculate a first loss with respect to a loss function; a weight quantizer to quantize the first group of network weights to generate low-bit second network weights corresponding to the first group of network weights; the loss calculator to calculate a second loss of the low-bit second network weights with respect to the loss function and to determine a difference between the first loss and the second loss; a weight updater to update the second group of network weights based on the difference between the first loss and the second loss, the second group of network weights to be partitioned by the network weight partitioner to continue partitioning, quantizing, and retraining unquantized network weights; and a network model deployer to deploy a low-bit deep neural network model including the low-bit second network weights.

Example 2 includes example 1 and further includes a network initializer to initialize weights, calculate a scaling factor, and set interval bound factors, wherein the network weight partitioner is to partition unquantized network weights using the interval bound factors.

Example 3 includes example 2, wherein the network initializer, the network weight partitioner, the loss calculator, the weight quantizer, the loss calculator, and the weight updater are to process each layer of the first deep neural network model to generate the low-bit second network weights for each layer to enable the model deployer to deploy the low-bit deep neural network model including a plurality of layers.

Example 4 includes example 3, wherein only convolutional layers and fully connected layers of the first deep neural network model are to be processed to generate the low-bit deep neural network model.

Example 5 includes example 1, wherein the weight quantizer is to quantize network weights into at least one of binary or ternary equivalent weights.

Example 6 includes example 1, wherein the loss calculator is to determine an approximation error between quantized network weights and the first deep neural network model to generate the difference between the first loss and the second loss.

Example 7 includes example 1, wherein the first group of network weights is to be quantized using a center of weight distribution for the first group of network weights.

Example 8 is a tangible computer-readable storage medium comprising computer readable instructions which, when executed, cause at least one processor to implement at least: a network weight partitioner to partition unquantized network weights of a first deep neural network model into a first group of network weights to be quantized and a second group of network weights to be retrained; a loss calculator to process network weights of the first deep neural network model to calculate a first loss with respect to a loss function; a weight quantizer to quantize the first group of network weights to generate low-bit second network weights corresponding to the first group of network weights; the loss calculator to calculate a second loss of the low-bit second network weights with respect to the loss function and to determine a difference between the first loss and the second loss; a weight updater to update the second group of network weights based on the difference between the first loss and the second loss, the second group of network weights to be partitioned by the network weight partitioner to continue partitioning, quantizing, and retraining unquantized network weights; and a network model deployer to deploy a low-bit deep neural network model including the low-bit second network weights.

Example 9 includes example 8, wherein the instructions, when executed, further cause the at least one processor to implement a network initializer to initialize network weights, calculate a scaling factor, and set interval bound factors, wherein the network weight partitioner is to partition unquantized network weights using the interval bound factors.

Example 10 includes example 9, wherein the network initializer, the network weight partitioner, the loss calculator, the weight quantizer, the loss calculator, and the weight updater are to process each layer of the first deep neural network model to generate second network weights for each layer to enable the model deployer to deploy the low-bit deep neural network model including a plurality of layers.

Example 11 includes example 10, wherein only convolutional layers and fully connected layers of the first deep neural network model are to be processed to generate the low-bit deep neural network model.

Example 12 includes example 8, wherein the weight quantizer is to quantize network weights into at least one of binary or ternary equivalent weights.

Example 13 includes example 8, wherein the loss calculator is to determine an approximation error between quantized network weights and the first deep neural network model to generate the difference between the first loss and the second loss.

Example 14 includes example 8, wherein the first group of network weights is to be quantized using a center of weight distribution for the first group of network weights.

Example 15 is a computer-implemented method comprising: partitioning, using at least one processor, unquantized network weights of a first deep neural network model into a first group of network weights to be quantized and a second group of network weights to be retrained; processing, using the at least one processor, network weights of the first deep neural network model to calculate a first loss with respect to a loss function; quantizing, using the at least one processor, the first group of network weights to generate low-bit second network weights corresponding to the first group of network weights; calculating, using the at least one processor, a second loss of the second network weights with respect to the loss function to determine a difference between the first loss and the second loss; updating, using the at least one processor, the second group of network weights based on the difference between the first loss and the second loss, the second group of network weights to be partitioned by the network weight partitioner to continue partitioning, quantizing, and retraining unquantized network weights; and deploying, using the at least one processor, a low-bit deep neural network model including the low-bit second network weights.

Example 16 includes example 15, wherein the method is to process each layer of the first deep neural network model to generate second network weights for each layer to deploy the low-bit deep neural network model including a plurality of layers.

Example 17 includes example claim 16, wherein only convolutional layers and fully connected layers of the first deep neural network model are to be processed to generate the low-bit deep neural network model.

Example 18 includes example 15, wherein quantizing further includes quantizing network weights into at least one of binary or ternary equivalent weights.

Example 19 includes example 15, wherein quantizing further includes quantizing the first group of network weights using a center of weight distribution for the first group of network weights.

Example 20 includes example 15, wherein calculating the second loss further includes determining an approximation error between quantized network weights and the first deep neural network model to determine the difference between the first loss and the second loss.

Example 21 is an apparatus comprising: means for partitioning unquantized network weights of a first deep neural network model into a first group of network weights to be quantized and a second group of network weights to be retrained; means for processing network weights of the first deep neural network model to calculate a first loss with respect to a loss function; means for quantizing the first group of network weights to generate low-bit second network weights corresponding to the first group of network weights; means for calculating a second loss of the second network weights with respect to the loss function to determine a difference between the first loss and the second loss; means for updating the second group of network weights based on the difference between the first loss and the second loss, the second group of network weights to be partitioned by the network weight partitioner to continue partitioning, quantizing, and retraining unquantized network weights; and means for deploying a low-bit deep neural network model including the low-bit second network weights.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for loss-error-aware quantization of a low-bit neural network, the apparatus comprising:
   a network weight partitioner to partition unquantized network weights of a first deep neural network model into a first group of network weights to be quantized and a second group of network weights to be retrained;
   a loss calculator to process network weights of the first deep neural network model to calculate a first loss with respect to a loss function;
   a weight quantizer to quantize the first group of network weights to generate low-bit second network weights corresponding to the first group of network weights;
   the loss calculator to calculate a second loss of the low-bit second network weights with respect to the loss function and to determine a difference between the first loss and the second loss;
   a weight updater to update the second group of network weights based on the difference between the first loss and the second loss, the second group of network weights to be partitioned by the network weight partitioner to continue partitioning, quantizing, and retraining unquantized network weights; and
   a network model deployer to deploy a low-bit deep neural network model including the low-bit second network weights.

2. The apparatus of claim 1, further including a network initializer to initialize weights, calculate a scaling factor, and set interval bound factors, wherein the network weight partitioner is to partition unquantized network weights using the interval bound factors.

3. The apparatus of claim 2, wherein the network initializer, the network weight partitioner, the loss calculator, the weight quantizer, the loss calculator, and the weight updater are to process each layer of the first deep neural network model to generate the low-bit second network weights for each layer to enable the model deployer to deploy the low-bit deep neural network model including a plurality of layers.

4. The apparatus of claim 3, wherein only convolutional layers and fully connected layers of the first deep neural network model are to be processed to generate the low-bit deep neural network model.

5. The apparatus of claim 1, wherein the weight quantizer is to quantize network weights into at least one of binary or ternary equivalent weights.

6. The apparatus of claim 1, wherein the loss calculator is to determine an approximation error between quantized network weights and the first deep neural network model to generate the difference between the first loss and the second loss.

7. The apparatus of claim 1, wherein the first group of network weights is to be quantized using a center of weight distribution for the first group of network weights.

8. A tangible computer-readable storage medium comprising computer readable instructions which, when executed, cause at least one processor to implement at least:
   a network weight partitioner to partition unquantized network weights of a first deep neural network model into a first group of network weights to be quantized and a second group of network weights to be retrained;
   a loss calculator to process network weights of the first deep neural network model to calculate a first loss with respect to a loss function;
   a weight quantizer to quantize the first group of network weights to generate low-bit second network weights corresponding to the first group of network weights;
   the loss calculator to calculate a second loss of the low-bit second network weights with respect to the loss function and to determine a difference between the first loss and the second loss;
   a weight updater to update the second group of network weights based on the difference between the first loss and the second loss, the second group of network weights to be partitioned by the network weight partitioner to continue partitioning, quantizing, and retraining unquantized network weights; and
   a network model deployer to deploy a low-bit deep neural network model including the low-bit second network weights.

9. The computer-readable storage medium of claim 8, wherein the instructions, when executed, further cause the at least one processor to implement a network initializer to initialize network weights, calculate a scaling factor, and set interval bound factors, wherein the network weight partitioner is to partition unquantized network weights using the interval bound factors.

10. The computer-readable storage medium of claim 9, wherein the network initializer, the network weight partitioner, the loss calculator, the weight quantizer, the loss calculator, and the weight updater are to process each layer of the first deep neural network model to generate second network weights for each layer to enable the model deployer to deploy the low-bit deep neural network model including a plurality of layers.

11. The computer-readable storage medium of claim 10, wherein only convolutional layers and fully connected layers of the first deep neural network model are to be processed to generate the low-bit deep neural network model.

12. The computer-readable storage medium of claim 8, wherein the weight quantizer is to quantize network weights into at least one of binary or ternary equivalent weights.

13. The computer-readable storage medium of claim 8, wherein the loss calculator is to determine an approximation error between quantized network weights and the first deep neural network model to generate the difference between the first loss and the second loss.

14. The computer-readable storage medium of claim 8, wherein the first group of network weights is to be quantized using a center of weight distribution for the first group of network weights.

15. A computer-implemented method comprising:
partitioning, using at least one processor, unquantized network weights of a first deep neural network model into a first group of network weights to be quantized and a second group of network weights to be retrained;
processing, using the at least one processor, network weights of the first deep neural network model to calculate a first loss with respect to a loss function;
quantizing, using the at least one processor, the first group of network weights to generate low-bit second network weights corresponding to the first group of network weights;
calculating, using the at least one processor, a second loss of the second network weights with respect to the loss function to determine a difference between the first loss and the second loss;
updating, using the at least one processor, the second group of network weights based on the difference between the first loss and the second loss, the second group of network weights to be partitioned using the at least one processor to continue partitioning, quantizing, and retraining unquantized network weights; and deploying, using the at least one processor, a low-bit deep neural network model including the low-bit second network weights.

16. The method of claim 15, wherein the method is to process each layer of the first deep neural network model to generate second network weights for each layer to deploy the low-bit deep neural network model including a plurality of layers.

17. The method of claim 16, wherein only convolutional layers and fully connected layers of the first deep neural network model are to be processed to generate the low-bit deep neural network model.

18. The method of claim 15, wherein quantizing further includes quantizing network weights into at least one of binary or ternary equivalent weights.

19. The method of claim 15, wherein quantizing further includes quantizing the first group of network weights using a center of weight distribution for the first group of network weights.

20. The method of claim 15, wherein calculating the second loss further includes determining an approximation error between quantized network weights and the first deep neural network model to determine the difference between the first loss and the second loss.

21. An apparatus comprising:
means for partitioning unquantized network weights of a first deep neural network model into a first group of network weights to be quantized and a second group of network weights to be retrained;
means for processing network weights of the first deep neural network model to calculate a first loss with respect to a loss function;
means for quantizing the first group of network weights to generate low-bit second network weights corresponding to the first group of network weights;
means for calculating a second loss of the second network weights with respect to the loss function to determine a difference between the first loss and the second loss;
means for updating the second group of network weights based on the difference between the first loss and the second loss, the second group of network weights to be partitioned by the means for partitioning to continue partitioning, quantizing, and retraining unquantized network weights; and
means for deploying a low-bit deep neural network model including the low-bit second network weights.

* * * * *